US009441913B1

(12) United States Patent
Donahoe

(10) Patent No.: US 9,441,913 B1
(45) Date of Patent: Sep. 13, 2016

(54) APPARATUS, SYSTEM AND METHOD FOR ARCHERY SIGHT SETTINGS

(71) Applicant: Full Flight Technology, LLC, Cambridge, MA (US)

(72) Inventor: Robert V Donahoe, Newton, MA (US)

(73) Assignee: Full Flight Technology, LLC, Cambridge, MA (US)

( * ) Notice: Subject to any disclaimer, the term of this patent is extended or adjusted under 35 U.S.C. 154(b) by 150 days.

(21) Appl. No.: 14/450,014

(22) Filed: Aug. 1, 2014

Related U.S. Application Data

(60) Provisional application No. 61/861,063, filed on Aug. 1, 2013, provisional application No. 61/913,006, filed on Dec. 6, 2013, provisional application No. 61/923,649, filed on Jan. 4, 2014.

(51) Int. Cl.
*G06F 3/048* (2013.01)
*F41G 1/467* (2006.01)
*F41G 11/00* (2006.01)
*G06F 3/0484* (2013.01)
*G06F 3/0488* (2013.01)

(52) U.S. Cl.
CPC ............... *F41G 1/467* (2013.01); *F41G 11/00* (2013.01); *G06F 3/0484* (2013.01); *G06F 3/0488* (2013.01)

(58) Field of Classification Search
CPC .................................................... G06F 3/0484
USPC ......................................................... 715/771
See application file for complete search history.

(56) References Cited

U.S. PATENT DOCUMENTS

| | | | |
|---|---|---|---|
| 4,617,741 A | 10/1986 | Bordeaux et al. | |
| 5,220,907 A * | 6/1993 | Lonsdale | F41G 1/467 124/87 |
| 6,154,971 A | 12/2000 | Perkins | |
| 6,191,574 B1 * | 2/2001 | Dilger | F41B 5/14 124/87 |
| 7,324,663 B2 * | 1/2008 | Kiraly | A63B 24/0021 348/169 |
| 7,614,156 B1 | 11/2009 | Imig | |
| 7,972,230 B2 | 7/2011 | Donahoe | |
| 8,221,273 B2 | 7/2012 | Donahoe | |
| 8,325,178 B1 * | 12/2012 | Doyle, Jr. | G06T 15/06 345/419 |
| 8,360,880 B2 * | 1/2013 | Abe | A63F 13/02 463/30 |

(Continued)

OTHER PUBLICATIONS

Archers Advantage—Palm Software, Oct. 4, 2006, retrieved from Internet Archives May 21, 2015, https://web.archive.org/web/20061004081813/http://www.archersadvantage.com/AdPages/AAPalm.htm.

(Continued)

*Primary Examiner* — William Titcomb
(74) *Attorney, Agent, or Firm* — Rhodes Donahoe, LLC; Robert V. Donahoe

(57) ABSTRACT

A non-transitory computer-readable medium whose contents cause a processing device including a touch screen display to perform a method for generating an archery sight setting, the method including acts of rendering a graphical user interface in the touch screen display, receiving a first input to the graphical user interface to select at least one archery parameter, and presenting a plurality of sight marks in the graphical user interface including at least a first sight mark and a second sight mark, the plurality of sight marks scaled within the graphical user interface to provide a 1:1 ratio between a first distance separating the first sight mark and the second sight mark in the graphical user interface and a second distance separating a first sighted-in position and a second sighted-in position in an archery sight including at least one mechanically-adjusted sight pin.

20 Claims, 16 Drawing Sheets

(56) References Cited

U.S. PATENT DOCUMENTS

| | | | |
|---|---|---|---|
| 8,400,448 B1* | 3/2013 | Doyle, Jr. | G06T 15/06 345/419 |
| 8,449,414 B2* | 5/2013 | Donahoe | F42B 6/08 473/582 |
| 8,736,583 B2* | 5/2014 | Anderson | A63F 13/06 345/175 |
| 8,914,986 B1 | 12/2014 | Forouhar | |
| 2003/0101604 A1 | 6/2003 | McGivern | |
| 2006/0008116 A1* | 1/2006 | Kiraly | G06T 7/0018 382/103 |
| 2007/0137088 A1* | 6/2007 | Peters | F41G 1/473 42/111 |
| 2008/0049012 A1* | 2/2008 | Bar-Joseph | G06T 19/00 345/419 |
| 2008/0289201 A1* | 11/2008 | Kroening, Jr. | F41G 1/467 33/265 |
| 2009/0165314 A1 | 7/2009 | Khoshnood | |
| 2009/0178287 A1* | 7/2009 | Humpert | F41G 1/467 33/265 |
| 2010/0115778 A1* | 5/2010 | Gorsuch | F41G 1/467 33/265 |
| 2010/0258628 A1* | 10/2010 | Bay | F41G 1/467 235/404 |
| 2011/0120438 A1 | 5/2011 | Samuels et al. | |
| 2011/0271536 A1* | 11/2011 | Logsdon | F41G 1/467 33/265 |
| 2011/0296699 A1* | 12/2011 | Mainsonneuve | F41G 1/467 33/228 |
| 2011/0297744 A1 | 12/2011 | Schneider et al. | |
| 2012/0122061 A1* | 5/2012 | Dohring | G09B 7/04 434/157 |
| 2012/0132709 A1* | 5/2012 | Lowrey, III | F41C 27/22 235/407 |
| 2012/0251982 A1* | 10/2012 | Hester | F41G 3/2694 434/19 |
| 2013/0036617 A1* | 2/2013 | Wasilewski | F41G 1/467 33/265 |
| 2013/0130217 A1* | 5/2013 | Dohring | G09B 5/00 434/350 |
| 2013/0174431 A1* | 7/2013 | Pulkrabek | F41G 1/467 33/228 |
| 2013/0274025 A1* | 10/2013 | Luciano, Jr. | A63B 69/3658 473/156 |
| 2013/0288743 A1* | 10/2013 | Hunt | F41G 11/004 455/556.1 |
| 2014/0144030 A1 | 5/2014 | Heaton et al. | |
| 2014/0171238 A1* | 6/2014 | Bay | F41G 1/35 473/570 |
| 2015/0089823 A1 | 4/2015 | Garrone | |

OTHER PUBLICATIONS

Archers Advantage—Windows Software, Oct. 4, 2006, retrieved from Internet Archives May 21, 2015, https://web.archive.org/web/20061004081944/http://www.archersadvantage.com/AdPages/AAIntro.htm.

Archers Advantage—Windows Software Preview Marks, Oct. 4, 2006, retrieved from Internet Archives May 21, 2015, https://web.archive.org/web/20061004082104/http://www.archersadvantage.com/AdPages/AAPreviewMarks.htm.

Pinwheel Software—Landing Page, Tapes and Charts, and Products pages, Nov. 2, 2006, retrieved from Internet Archives May 21, 2015: https://web.archive.org/web/20061004034251/http://pinwheelsoftware.com/; https://web.archive.org/web/20061102090816/http://www.pinwheelsoftware.com/tac.aspx; https://web.archive.org/web/20061102090757/http://www.pinwheelsoftware.com/products.aspx.

Pinwheel Software—screen shots of operation of trial software, downloaded, Jun. 3, 2015.

The Archery Program—landing page, Oct. 23, 2006, retrieved from Internet Archives May 21, 2015, https://web.archive.org/web/20061023081202/http://www.thearcheryprogram.com/.

Easton Archery, "Easton 2010 Target Catalog", pp. 1, 30-35, 2010, also available on-line http://archery-shop.jp/catalog/2010TargetCatalog.pdf.

Wise, Larry, "Understanding Draw Force Curves" ArrowTrade, pp. 78-83, Nov. 2006.

Firenock, 2013 Catalog, "iBowSight" Front Cover, pp. 13-14, Jan. 2013.

Olssen, Bertil, "Calculating Arrow Speed From Simple Measurements" Archery Focus, pp. 32-35, Jan./Feb. 2012.

* cited by examiner

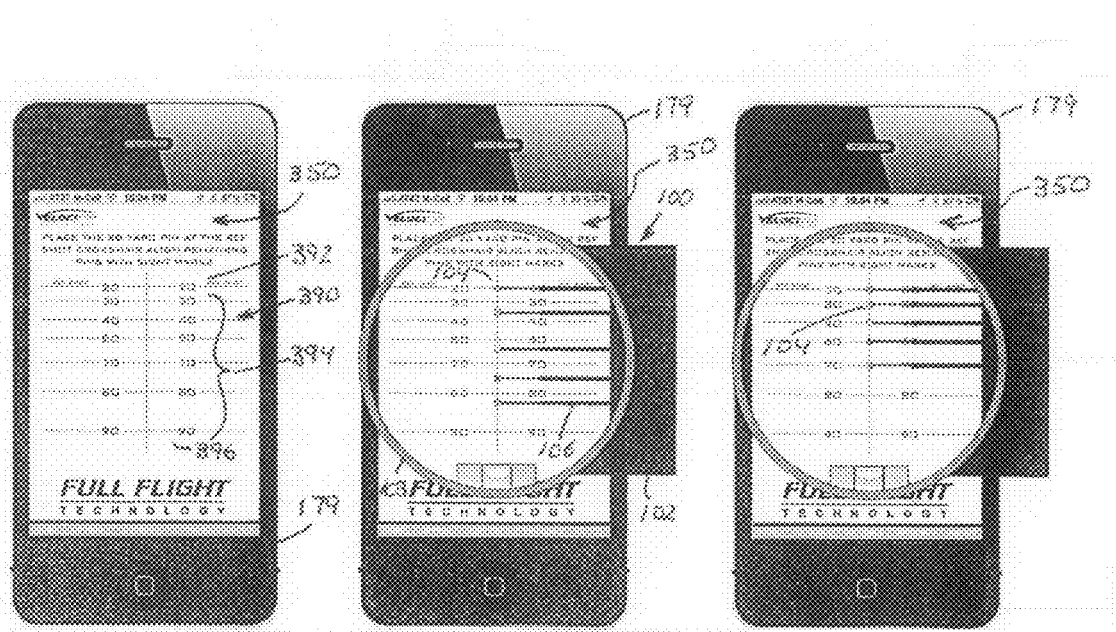

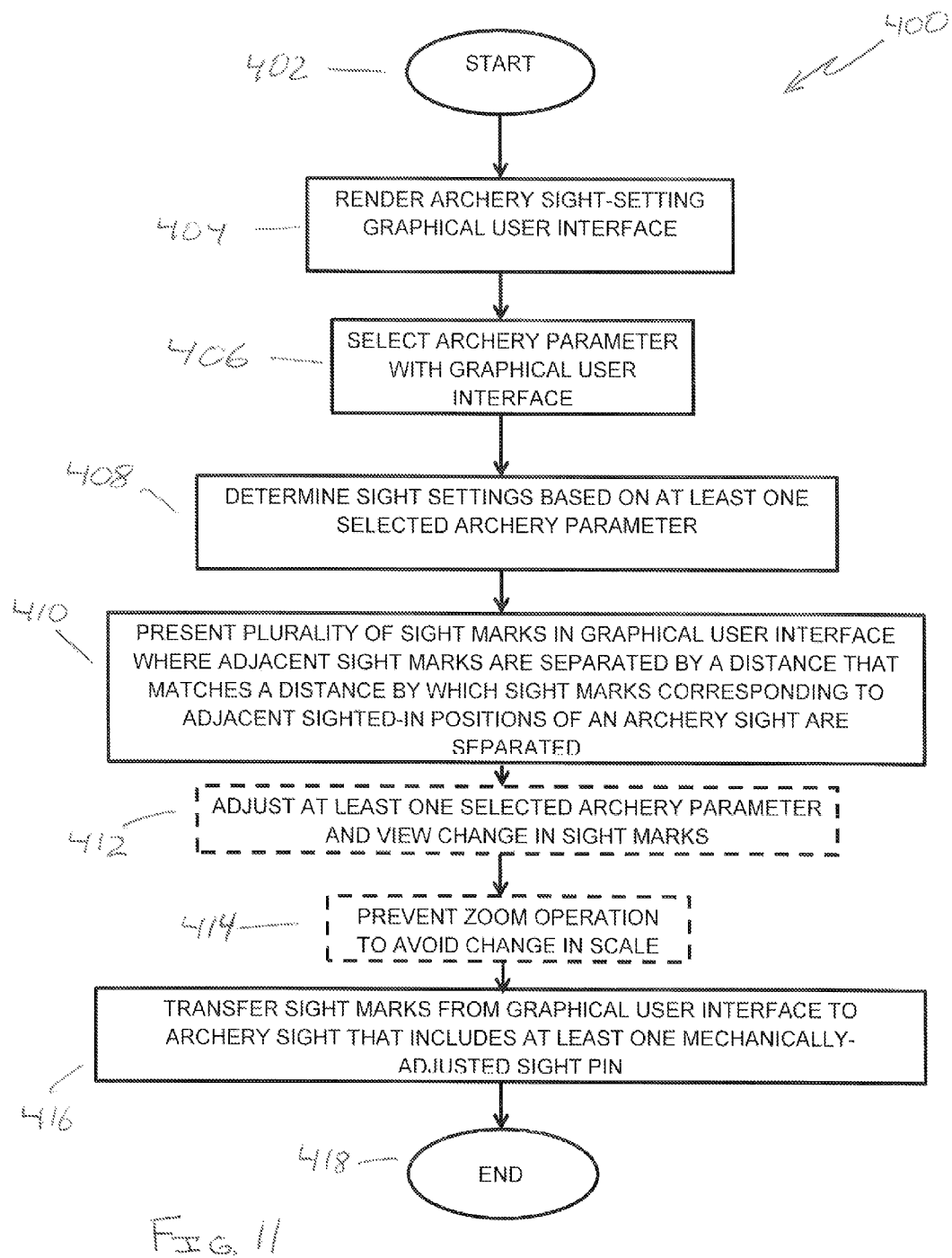

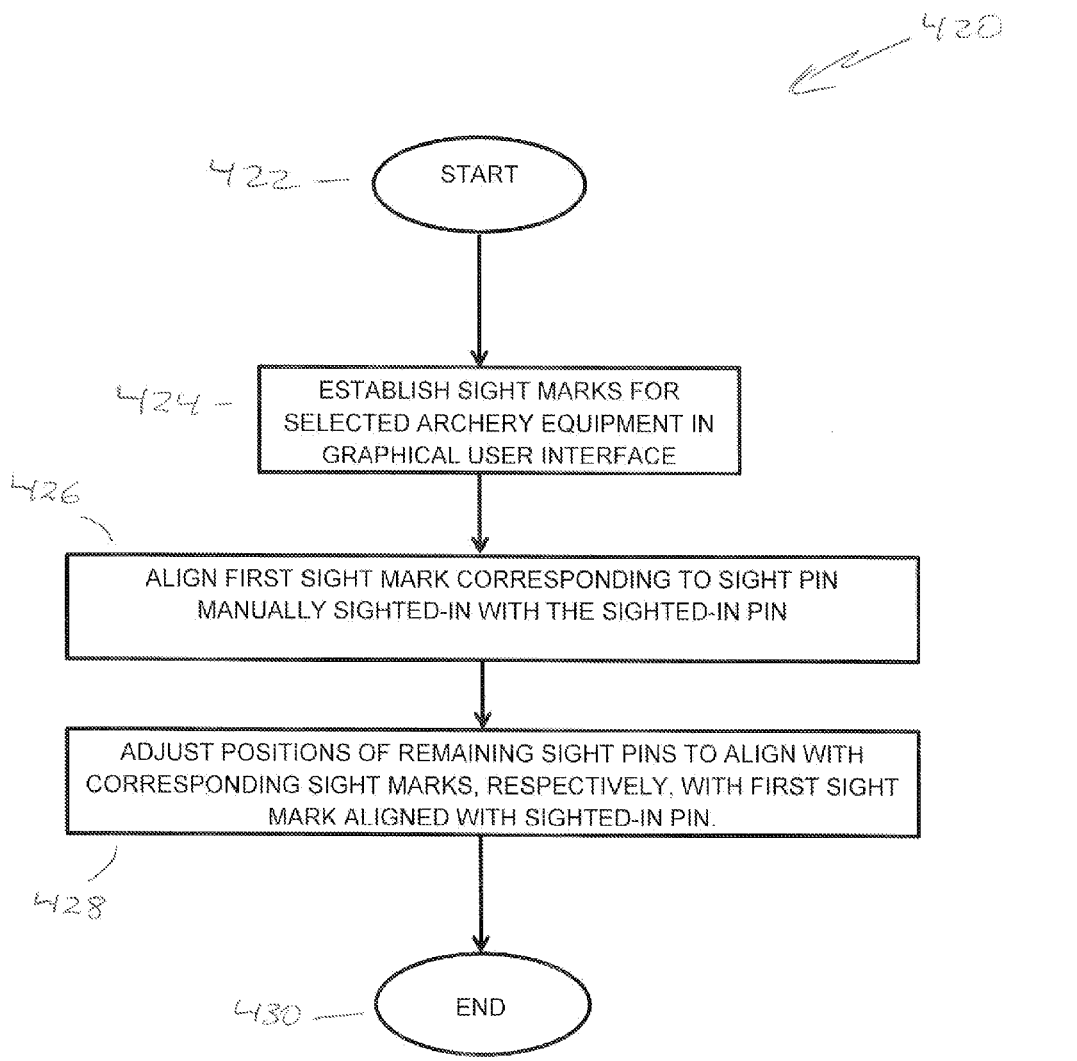

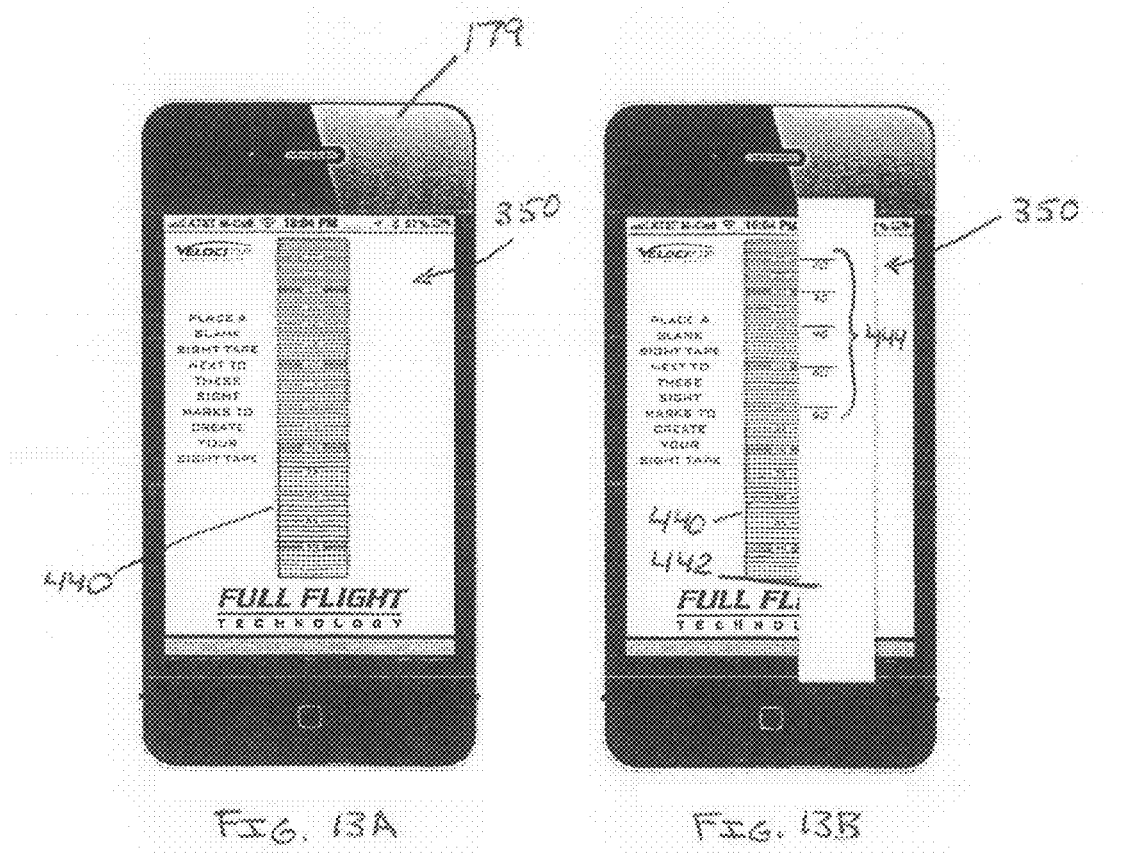

APPARATUS, SYSTEM AND METHOD FOR ARCHERY SIGHT SETTINGS

RELATED APPLICATIONS

The application claims the benefit under 35 U.S.C. §119 (e) to each of U.S. Provisional Application Ser. No. 61/861,063, entitled "APPARATUS, SYSTEM AND METHOD FOR ARCHERY SIGHT PIN POSITIONS," filed on Aug. 1, 2013, U.S. Provisional Application Ser. No. 61/913,006, entitled "APPARATUS, SYSTEM AND METHOD FOR ESTABLISHING ARCHERY SIGHT SETTINGS," filed on Dec. 6, 2013, and U.S. Provisional Application Ser. No. 61/923,649, entitled "APPARATUS, SYSTEM AND METHOD FOR ESTABLISHING ARCHERY SIGHT SETTINGS," filed on Jan. 4, 2014. The disclosure of each of the preceding applications is herein incorporated by reference in its entirety.

BACKGROUND OF INVENTION

1. Field of Invention

Embodiments of the invention generally relate to archery equipment. More specifically, embodiments relate to apparatus, system and methods for establishing archery sight settings.

2. Discussion of Related Art

The field of archery involves the accurate placement of an arrow striking a target some distance from the point of release by the archer. The effect of gravity on the arrow's flight acts to draw the arrow back toward the ground as the arrow travels from the archer toward the target. To compensate for the effects of gravity, an archer holding a bow and aiming at a distant target, located at approximately the same elevation as the archer, will raise the bow such that the tip of the arrow is elevated above the rear of the arrow shaft. As a result, the arrow shaft is not located in a horizontal plane. Instead, the arrow has a pitch that is generally upward at a positive angle relative to the horizontal plane. During the subsequent shot, the arrow's flies in a parabolic trajectory, i.e., the arrow flies in an arc. The greater the shot-distance (distance between the archer and the target) the more pronounced the arc-of-flight. The arc-of-flight results in a constantly changing elevation as the arrow travels from the point of launch to the point of target impact.

In addition to gravity, the arrow's launch speed and drag also affect the amount of pitch that must be provided at launch to strike a point-of-aim on a target, because both the arrow's drag and its speed effect the time-of-flight from launch to impact. The greater the time-of-flight the more pronounced the arc-of-flight because an increased time-of-flight allows gravity to act on the arrow for a longer period of time. Thus, when comparing shots for different archery equipment, an arrow having a lower speed at launch and/or greater drag must be released at a greater pitch (relative to the horizontal plane) when compared with an arrow that leaves a bow at greater speed and/or has a lower drag.

An archer's understanding of the arrow's change in elevation over various distances is important to their success in both target archery and hunting. To-date, however, when setting archery sights in advance of shooting, archers have been forced to rely on trajectory estimates that are based only on an arrow's launch speed. Other approaches may also include theoretical affects based on the arrows weight as estimated by its length and mass/unit length (commonly expressed in grains/inch) or other physical characteristics. However, these approaches are inadequate because they do not account for the loss of speed in flight caused by the arrow's drag and/or they are difficult and tedious to complete. Further, differences in arrow drag are difficult to estimate and can only roughly approximate the effects on an arrow's trajectory. The preceding can result in significant differences in a point-of-impact on a target (i.e., decreasing accuracy), especially for longer distance shots.

Archery sights are affixed to an archery bow to allow the archer to precisely aim at a distant target. The sight includes at least one sight pin that is adjusted so that the archer can align it with a distant bullseye. As the distance to the target increases, a lower sight pin elevation is employed. This results in the archer raising the bow higher to align the sight pin with the bullseye as the shot-distance increases.

Archery sights fall into two general categories, single pin sights and multi-pin sights. Where a single pin sight is used the sight pin is temporarily locked in place when a shot is taken and the archer adjusts the elevation of the pin when the shot distance changes. In contrast, multi-pin sights generally include from 3-7 separate pins each used when shooting at a different known distance, respectively.

A sight-pin is sighted-in when an archer can place the sight pin over the center of the bullseye in their line-of-sight with the bow drawn, loose the arrow with the sight pin so located, and strike the center of the target. Because of the constantly changing elevation of an arrow in flight, the preceding result means that the sight-pin is sighted-in for the single shot-distance at which that particular shot or series of shots are taken.

Where a multi-pin sight is used an archer sights in each of the sight pins at a different known distance, respectively, and secures it in place. The sight pin for the closest of the selected distances is located at the highest elevation in the sight relative to the remaining sight pins. Conversely, the sight pin for the furthest of the selected distances is located at the lowest elevation in the sight relative to the remaining sight pins. Because a wide range of distance can be covered with a multi-pin sight, the sight pins typically are fixed in place via individual set screws. Accordingly, multi-pin sights are sometimes referred to as "fixed-pin" sights although they are adjustable at least during the sighting-in process. Once sighted in, the position of the sight pins is not adjusted unless something is changed with the archer, the bow or the arrow that affects arrow flight and trajectory.

Generally, single pin sights employ a sight tape that is affixed to the sight, for example, the sight-housing, and an alignment pin. The sight tape is marked with a series of marks for various shot-distances. The alignment pin provides the archer with a visual indication of the shot-distance that the sight pin is adjusted for. In some sights, the sight tape is stationary and the alignment pin moves with the sight pin as the elevation of the sight is adjusted. In other single pin sights, sight-adjustment moves the sight tape while the alignment pin remains stationary.

Today, manufacturers often provide a set of sight tapes and a marking tape for a given sight. To begin the sighting-in process, the archer places the marking tape on the sight and takes a shot or series of shots at a first known-distance to sight-in at that distance. In particular, a first known-distance that is marked on the tapes in the set of sight tapes. When the sight pin elevation is properly set for the first known-distance (the bow is sighted-in at the first distance), the archer marks the position of the alignment pin on the marking tape. The archer then takes a shot or series of shots at a second known-distance to sight-in at the second distance. The second known-distance is also a distance that is marked on the sight tapes. When the sight pin elevation is properly set for the second known-distance, the archer marks the position of the alignment pin on the marking tape. The sight tape is selected based on the distance separating the two marks on the marking tape, i.e., the gap between the two marks. Specifically, the archer compares the distance between the marks on the marking tape with the distance between the marks for the same two shot-distances on the tapes included in the set of sight tapes. The sight tape that is used is the sight tape that has a distance separating the marks for the first and second known-distances that most closely matches the distance established by the marking tape. In some approaches, a gauge is used to compare the gap on the marking tape with gaps provided on the various sight tapes in the set.

FIG. 5 illustrates a known process 160 for sight-tape selection. The process 160 requires that that the bow be sighted-in at a first distance and a second distance much farther downrange than the first distance. In particular, at act 162, the bow is sighted in at first distance (for example, 20 or 30 yards). The archer records the position of the sight pin for the first distance at act 163, for example by marking a blank set-up tape mounted on the archery sight. The process is then repeated at acts 164 and 165. For example, at act 164, the bow is sighted in at second distance (generally, 40 or more yards downrange). At act 165, the position of the sight pin for the second distance is recorded. At act 166, the sight tape for use across a range of distance from 20-80 yards downrange is selected from a set of sight tapes based on a difference between the sight pin position for the first distance and the sight pin position for the second distance.

Other manufacturers use a similar approach with a set-up tape that is pre-marked with indicia. A difference in value between a value of the numerical indicia adjacent the alignment pin when sighted-in at the first known-distance and a value of the numerical indicia adjacent to the alignment pin when sighted-in at the second known-distance is used to select the sight tape.

Depending on the type of structure employed to adjust the sight pin (for example, arms, levers, wheels, knobs and the like) the ratio of movement of the alignment pin relative to movement of the sight pin can vary. However, regardless of the specific means of adjustment, these approaches require accurate shooting to establish the sight-pin settings at the two known distances. Therefore, the difficulty with such approaches is the amount of time they require to complete and the fact that long distant shots must be used for at least one of the two known-distances. For example, a first shot-distance of 20 yards and a second distance of 50 yards are recommended in one approach while shot-distances of 30 and 60 yards are recommended in another approach. The long shot-distances of 50 and 60 yards are more difficult to sight-in because the group-size of a series of arrows shot at such distances are significantly larger on average than the group-size for shots taken at shorter distances. Therefore, it becomes more difficult for the archer to assess whether they are sighted-in with enough precision at that distance. Longer shot-distances not only make it difficult to accurately sight-in they also require more space than is typically available at indoor range facilities. Therefore, it can be difficult to locate a facility that allows the conventional sight-in procedure. In addition, it is easier to lose arrows outdoors at long shot-distances.

The preceding challenges also arise where a multi-pin sight is used because long distance shots must also be taken. Typically, for example, many archers take 20 yard shots to set the elevation for a 20 yard pin, 30 yard shots to set the elevation for a 30 yard pin, 40 yard shots to set the elevation for the 40 yard pin, 50 yard shots to set the elevation for the 50 yard pin, etc. Thus, the sight pin setting at 40, 50 or more yards results in the above drawbacks of shooting a long distance during the sight-in process.

Other archers use software to establish a series of pin gaps for a multi-pin sight. However, these software programs suffer from many of the same drawbacks because they also require that the archer sight-in at multiple distances including at least one distance of 50 yards or more. In addition, some of these approaches attempt to estimate a trajectory of an arrow based on the physical parameters of the arrow, i.e., how aerodynamic the arrow is. However, estimated arrow drag often results in an imprecise value. As a result, the pin gaps or sight tape settings are less precise than required.

Further, even where a pin gap for a multi-pin sight is known it must be transferred to the sight itself. However, current approaches are crude and lack precision. For example, one approach provides a pin-gapping printout printed using a thermal printer where the printout is based on arrow launch velocity. However, this approach is imprecise, is provided in a low resolution format and provides a result in a form that makes it difficult to directly transfer to an archery sight. Further, even the manner in which the indicia are provided can limit their effectiveness. For example, markings may include filled objects which are obscured by the actual pins or lack both horizontal and vertical lines used to identify the pin locations. In addition, the preceding approach requires access to a printer. As a result, the approach does not allow the user any mobility, for example, the ability to go to an outside archery range where electricity is unavailable and try the effects of various equipment adjustments on their sight settings.

These approaches are also tedious and inflexible because the user cannot easily determine how a change in one or more parameters (for example, overall arrow weight, arrow weight distribution sometimes referred to as front-of-center, arrow launch speed, arrow drag, etc.) effects the location of the sight marks relative to one another. In particular, the approach does not provide any ability to see the effects of changes in equipment performance on archery sight settings as the changes are made.

Thus, improvements in the approach for accurately determining an arrow's trajectory and establishing corresponding sight pin settings or other sight marks are necessary.

Electronic archery sights are known, for example, virtual archery sights located in a phone display where the phone is mounted to the bow. However, electronic archery sights are not legal in many states. Also, electronic sights can easily be damaged in the field by shock and/or moisture. They also require a power source that necessarily limits the amount of time the archer can spend in the field on a single charge. Once power is lost the sight becomes inoperative. Thus, improvements for establishing accurate sight marks for traditional archery sights are necessary.

Commonly-owned U.S. Pat. No. 8,221,273, entitled "APPARATUS, SYSTEM AND METHOD FOR ARCHERY EQUIPMENT," issued on Jul. 17, 2012 (the '273 patent), generally describes a touchpad screen employed in an archery system. U.S. Pat. No. 8,221,273 is herein incorporated by reference in its entirety. However, neither the '273 patent nor any other prior approach describes how to utilize a portable electronic device with any style of display to generate a set of sight marks in a manner that allows the sight marks to be easily transferred from a graphical user interface to an archery sight, in particular, to an archery sight that includes one or more sight-pins whose location in the sight housing is mechanically adjusted.

SUMMARY OF INVENTION

Therefore there is a need for efficient apparatus, systems and methods for creating accurate archery sight settings that are easily transferred to an archery sight. In accordance with the various aspects described herein, advantageous use of electronics greatly assists the sighting-in process for archers using traditional archery sights. According to various embodiments, the apparatus, systems and methods described herein can save hours of time for an archer setting up a conventional archery sight. Such approaches can be employed with multi-pin sights and single pin sights including those using a sight tape.

In accordance with the various aspects described herein, the use of measured arrow drag and/or time-of-flight reduces the complexity of archery sight adjustment while providing a higher level of precision for sight pin settings. For example, such approaches can eliminate the need to shoot at long distance and the need to use an outdoor range Eliminating the dependence on long shot distances, therefore, creates an approach that is suited to a wider range of facilities and a wider range of archers (i.e., those with a lower skill level who are not comfortable sighting-in at long shot-distances).

The process used to accurately set the sight pin locations in the archery sight is referred to as "sighting-in" the bow. An accurately adjusted sight has the elevation of the sight pin(s) properly established for use when shooting at one or more distances and is referred to as being "sighted-in." Further, in a multi-pin sight, the pin setting for a given distance is "sighted-in" when the position of that individual pin is established to allow the archer to consistently hit the bullseye at the given distance by aligning the pin with the bullseye when the arrow is loosed from the bow.

In some embodiments, the apparatus, systems and method described herein provide tools to generate archery sight settings on smart phones and other portable display devices. These tools allow for generation of a plurality of sight marks that are precisely located relative to one another in a graphical user interface, for example, a touch screen display of a mobile device. Further, various embodiments can allow a user to easily create the plurality of sight marks using processes that deliver a more accurate result because they include one or more archery parameters that are directly measured, for example, arrow drag and/or time-of-flight measured with electronics included in an arrow when shot from a bow that is being sighted-in.

Embodiments of these tools provide a visual reference for bowsight adjustment in a portable electronic device. Further, the tool can provide immediate feedback to a user by adjusting the sight marks included in a sight-setting tool in real-time or substantially real-time in response to the user changing one or more archery parameters. As used herein, the term "real-time" refers to an occurrence of a result, an act or an event in a time period that is short enough to cause a user to not notice a delay between the delivery of the result, occurrence of an act or event in response to a predecessor act such as a selection or an input.

Embodiments can greatly increase the certainty provided by a set of archery sight marks while greatly reducing the number of arrows that must be shot to arrive at a plurality of sight marks that are accurately sighted-in. According to further embodiments, only a single sight mark need be manually sighted-in by shooting the bow and arrow. The single sight mark can then serve as a reference for a full set of sight marks generated by the portable electronic device.

As used herein, a "sight mark" is a reference used to establish an elevation of a sight pin where the sight pin is employed by an archer to aim an archery bow when releasing an arrow from the bow. The "sight mark" can be provided in an electronic display medium (for example, as rendered in a graphical user interface), in printed form or other formats such as stamped, painted, engraved, or etched in a sight housing. Those of skill in the art will recognize that a "sight mark" can be provided in a variety of forms including solid geometric shapes, outlined geometric shapes, cross hairs and hash marks to name a few examples.

As used herein, "mechanically-adjusted" with reference to an object such as a sight, a sight-pin or a sight housing refers to the ability to change a position of the object by employing a mechanically operated element such as fastener (for example, a nut, a bolt or a screw, such as an allen screw), a sliding element, a gear, a lever, a wheel, a dial, and/or thumbwheel alone or in combination with one another or other mechanically operated elements. Those of skill in the art will recognize that mechanically-adjusted refers to: 1) an operation in which a mechanically operated element is operated to at least partly free the object and allow a user to physically displace the object to change the object's position; 2) an operation in which a mechanically operated element is operated to physically displace the object to change the object's position; 3) a combination of both 1) and 2); and 4) a combination of 1) and/or 2) with one or more additional operations.

Accordingly, those of skill in the art will recognize that "mechanically-adjusted" when used with reference to a sight pin, refers to a structure that includes a tangible sight-pin object, for example, a three dimensional object. Those of skill in the art will also recognize that an electronic archery sight that displays a sight pin in an electronic display mounted to a bow (for example, a sight pin displayed in a smartphone attached to the bow) does not provide a mechanically-adjusted sight pin because such a sight pin is not a 3D object that can be physically displaced by mechanical means. For example, moving a graphically rendered sight pin from a first location within an electronic display to a second location within the electronic display is not a mechanical adjustment. Further, moving the elevation of the entire smartphone, referring to the above example, does not make the virtual sight pin mechanically-adjusted because a position of the virtual sight-pin cannot be mechanically adjusted independent of a movement of the display.

As used herein, an "archery parameter" refers to information that can be used either alone or in combination with one or more other pieces of information to determine an arrow's expected flight. Those of skill in the art will recognize that an "archery parameter" can include: archery equipment identification information (for example, equipment manufacturer, a type of bow, type of arrow, and/or type of vanes); archery equipment setting information (for example, draw length, draw weight, peep-to-sight dimensions and/or peep-to-arrow dimensions); and archery equipment performance information (for example, rated bow speed, arrow launch speed, arrow drag) as some non-limiting examples.

In one aspect, a non-transitory computer-readable medium whose contents cause a processing device including a touch screen display to perform a method of generating an archery sight setting for an archery sight including at least one mechanically-adjusted sight pin is provided, where the method includes acts of: rendering a graphical user interface in the touch screen display; receiving a first input to the graphical user interface to select at least one archery parameter; and presenting a plurality of sight marks in the graphical user interface including at least a first sight mark and a second sight mark, the plurality of sight marks scaled within the graphical user interface to provide a 1:1 ratio between a first distance separating the first sight mark and the second sight mark in the graphical user interface and a second distance separating a first sighted-in position and a second sighted-in position of the archery sight. According to some embodiments, the first distance is determined at least in part based on the at least one selected archery parameter and provides a reference with which to establish the second distance and the second sighted-in position for a shot-distance for which the second sighted-in position of the archery sight is established.

According to one embodiment, the method further includes presenting the plurality of sight marks as a plurality of pin positions for a multi-pin sight. In an alternate embodiment, the method includes presenting a virtual sight tape including the plurality of sight marks in the graphical user interface.

In a further embodiment, the method further includes receiving a plurality of inputs to the graphical user interface, each of the plurality of inputs concerning a different one of a plurality of archery parameters. In various embodiments, the method includes receiving the archery parameter selected from a group consisting of any one of or any combination of an archery equipment setting, an archery equipment performance and an archery equipment identification.

In a still further embodiment, the method includes receiving an input concerning a user parameter where the user parameter is selected from a group consisting of any one of or any combination of a height, a weight, a reach, and a gender.

According to another aspect, an apparatus includes a display is provided including; one or more processors coupled to the display; and a computer storage medium storing instructions that, when executed by the one or more processors, cause the one or more processors to perform operations that generate an archery sight setting for an archery sight including at least one mechanically-adjusted sight pin, the operations including: rendering a graphical user interface in the display; receiving a first input to the graphical user interface to select at least one archery parameter; and presenting a plurality of sight marks in the graphical user interface including at least a first sight mark and a second sight mark, the plurality of sight marks scaled within the graphical user interface to provide a 1:1 ratio between a first distance separating the first sight mark and the second sight mark in the graphical user interface and a second distance separating a first sighted-in position and a second sighted-in position of the archery sight. In some embodiments, the first distance is determined at least in part based on the at least one selected archery parameter and provides a reference with which to establish the second distance and the second sighted-in position for a shot-distance for which the second sighted-in position of the archery sight is established.

According to still another aspect, a computer implemented method is provided for generating an archery sight setting using a graphical user interface presented in a display of a portable electronic device, the archery sight setting generated for an archery sight including at least one mechanically-adjusted sight pin, where the method includes: receiving a first input to the graphical user interface to select at least one archery parameter; and presenting a plurality of sight marks in the graphical user interface including at least a first sight mark and a second sight mark, the plurality of sight marks scaled within the graphical user interface to provide a 1:1 ratio between a first distance separating the first sight mark and the second sight mark in the graphical user interface and a second distance separating a first sighted-in position and a second sighted-in position in the archery sight, where the first distance is determined at least in part based on the at least one selected archery parameter and provides a reference with which to establish the second distance and the second sighted-in position for a shot-distance for which the second sighted-in position of the archery sight is established.

Applicant has recognized and appreciated that modern sensing technology provides new opportunities to collect arrow flight-data that can be used to more accurately estimate an arrow's trajectory over a range of distance. One such flight data recording system concerns microelectronic sensing systems included in arrows to measure flight characteristics. Some of these microelectronic systems precisely measure time-of-flight and arrow drag. Such approaches are described, for example, in the following applications owned by the applicant of this application: U.S. patent application Ser. No. 12/982,456, entitled "Apparatus, System and Method for Electronic Archery Devices," filed Dec. 30, 2010; U.S. Pat. No. 8,221,273, entitled "Apparatus, System and Method for Archery Equipment," issued Jul. 17, 2012; and U.S. Pat. No. 7,972,230, entitled "System and Apparatus for Archery Equipment," issued Jul. 5, 2011. Each of the preceding patents or patent applications is herein incorporated by reference in its entirety.

According to one aspect, a method is provided for determining a trajectory of an arrow using data provided by an apparatus included in the arrow. In one embodiment, the method includes measuring, with an apparatus included in the arrow, a change in acceleration resulting during a flight of the arrow for a known shot-distance, the arrow striking a point of aim on a target; and determining from the change in acceleration at the known shot-distance an elevation change relative to the point of aim for at least one shot-distance that differs from the known shot-distance.

According to another embodiment, the method includes determining, using acceleration data measured with an apparatus included in the arrow, a drag resulting during a flight of the arrow for a known shot-distance, the arrow striking a point of aim on a target; and determining, using the arrow drag determined for the flight of the arrow at the known shot-distance, an elevation change relative to the point of aim for at least one shot-distance that differs from the known shot-distance. According to one version, the method includes determining a drag coefficient as a measure of the arrow drag for the at least one shot. According to further embodiments, the method includes determining, with the acceleration data measured with the apparatus included in the arrow, the drag resulting during the flight of the arrow for the known shot-distance for a plurality of shots.

According to another aspect a method of establishing pin settings for an archery sight used with a bow and an arrow, the archery sight including at least one sight pin is provided. In some embodiments, the method includes acts of: storing, with an apparatus included in the arrow when shot from the bow, data concerning a drag of the arrow; sighting-in with the bow and the arrow at a first shot-distance to establish an elevation of a first location of the sight pin, the first location for use when shooting at a first shot-distance; selecting a second location of the sight pin for use when shooting at a second shot-distance, the second shot-distance and the first shot-distance separated by a known distance; determining, with the data, the drag of the arrow when shot from the bow; and determining a gap between the elevation of the first location and an elevation of the second location based at least in part on the drag, a launch speed of the arrow when shot from the bow and the known distance.

According to a further aspect an apparatus includes a communication interface configured to receive information concerning at least one of a time of flight of an arrow and a measured drag of the arrow, one or more processors coupled to the communication interface; and a computer storage medium storing instructions. Further the stored instructions, when executed by the one or more processors, cause the one or more processors to perform operations including: determining a distance between a position of a first sight pin of an archery sight and a position of a second sight pin of the archery sight using the at least one of the time of flight of the arrow and the measured drag.

According to still another aspect an apparatus includes a communication interface configured to receive information concerning at least one of a time of flight of an arrow and a measured drag of the arrow, one or more processors coupled to the communication interface, and a computer storage medium storing instructions. Further the stored instructions, when executed by the one or more processors, cause the one or more processors to perform operations including: determining a distance between a first location of an adjustable sight pin of an archery sight and a second location of the adjustable sight pin using the at least one of the time of flight of the arrow and the measured drag, wherein the first location corresponds to first sight position selected to sight-in an archery bow at a first shot-distance and the second location corresponds to a second sight position for a second shot-distance.

According to yet another aspect an apparatus includes a display, one or more processors coupled to the display; and a computer storage medium storing instructions. The stored instructions, when executed by the one or more processors, cause the one or more processors to perform operations including: receiving a first input concerning a drag of an arrow when shot from a bow, receiving a second input providing a first shot-distance for which the archery sight is sighted-in, receiving a third input identifying other shot-distances for which the archery sight includes pins, and rendering an archery sight pin alignment tool in the display to provide pin elevations in the archery sight for pins associated with the other shot-distances, respectively. Further, the pin elevations provide sighted-in positions for the pins associated with the other shot-distances.

According to still another aspect a method of employing an electronic display device to establish sight pin location in an archery sight including a plurality of sight pins is provided. In some embodiments, the method includes presenting an archery sight pin alignment tool in a display included in the electronic display device, the sight pin alignment tool providing a scaled representation of positions of the plurality of sight pins, respectively; locating the display to allow a user to view the plurality of sight pins in front of the display; aligning a first indicia included in the scaled representation with a first sight pin included in the plurality of sight pins; and aligning a second sight pin included in the plurality of sight pins with a second indicia included in the scaled representation, the first indicia in alignment with the first sight pin when an aligned position of the second sight pin is established.

According to one embodiment, the method includes aligning the first indicia with the first sight pin by moving a position of the display. In a further embodiment, the plurality of sight pins are located within a sight housing, and the method includes moving the position of the display with the display placed against the sight housing.

According to another embodiment, the plurality of sight pins are located within a sight housing, and the method includes placing the display against the sight housing when aligning the first indicia with the first sight pin. In a further embodiment, the method further comprises placing the display against the sight housing when aligning the second sight pin with the second indicia.

According to another aspect, an electronic display device includes a touch screen display, one or more processors coupled to the display and a computer storage medium storing instructions. The stored instructions, when executed by the one or more processors, cause the one or more processors to perform operations including: presenting an archery sight pin alignment tool in the touch screen display, the sight pin alignment tool providing a scaled representation of positions of the plurality of sight pins, respectively; locating the display to allow a user to view the plurality of sight pins in front of the display; aligning a first indicia included in the scaled representation with a first sight pin included in the plurality of sight pins; and aligning a second sight pin included in the plurality of sight pins with a second indicia included in the scaled representation, the first indicia in alignment with the first sight pin when an aligned position of the second sight pin is established.

According to a further embodiment, the plurality of sight pins include a plurality of additional sight pins in addition to the first sight pin and the second sight pin, and the method includes aligning each of the plurality of additional sight pins with corresponding indicia included in the scaled representation, respectively, to establish a respective aligned position for each of the plurality of additional sight pins; and establishing each of the respective aligned positions with the first indicia in alignment with the first sight pin and the second indicia in alignment with the second sight pin. In one embodiment, the method includes establishing each of the respective aligned positions with the additional sight pin in alignment with the respective corresponding indicia if the respective aligned position of the additional sight pin is already established. In accordance with some embodiments, the electronic display device includes a touchscreen. In still further embodiments, the first indicia and the second indicia are included in a plurality of crosshairs included in the archery sight pin alignment tool.

In another aspect, a method of employing an electronic display device to establish sight mark locations for an archery sight employing a sight tape and at least one adjustable sight pin, the archery sight for use with a selected bow and arrow is provided. In some embodiments, the method comprises presenting an archery sight mark tool in a display included in the electronic display device, the sight mark tool providing a graphical representation of a plurality of sight marks relative to one another, respectively; establishing a distance between adjacent sight marks included in the plurality of sight marks to allow the sight pin to be adjusted to a plurality of elevations each of the plurality of elevations corresponding to one of a plurality of known shot distances, respectively; and scaling the plurality of sight marks as presented in the display such that each sight mark places the sight in a sighted-in position for a respective shot distance included in the plurality of known shot distances when the sight marks are employed as a part of the sight tape.

In accordance with some further embodiments, the method includes scaling the distance between adjacent sight marks on a 1:1 ratio relative to the sight tape. In one embodiment, the method comprises locking the display to prevent adjustment to a scale established by the act of scaling.

In accordance with still further embodiments, the method includes placing the sight tape on a surface of the display adjacent the plurality of sight marks; and transferring the plurality of sight marks to the sight tape. In one embodiment, the method includes temporarily fixing a location of the sight tape adjacent the plurality of sight marks; and hand-marking the sight tape with at least some of the plurality of sight marks.

According to another aspect, an electronic display device includes a touch screen display, one or more processors coupled to the display and a computer storage medium storing instructions. The stored instructions, when executed by the one or more processors, cause the one or more processors to perform operations including: presenting an archery sight mark tool in the touch screen display, the sight mark tool providing a graphical representation of a plurality of sight marks relative to one another, respectively; establishing a distance between adjacent sight marks included in the plurality of sight marks to allow the sight pin to be adjusted to a plurality of elevations each of the plurality of elevations corresponding to one of a plurality of known shot distances, respectively; and scaling the plurality of sight marks as presented in the display such that each sight mark places the sight in a sighted-in position for a respective shot distance included in the plurality of known shot distances when the sight marks are employed as a part of the sight tape.

In yet another aspect, a method of employing an electronic display device to establish sight pin location for an archery sight including a plurality of sight pins, the archery sight for use with a selected bow and arrow is provided. According to some embodiments, the method includes associating each of the plurality of sight pins with a shot distance, respectively; presenting an archery sight pin alignment tool in a display included in the electronic display device, the sight pin alignment tool providing a graphical representation of positions of the plurality of sight pins relative to one another, respectively; including in the archery sight pin alignment tool at least a first indicia corresponding to a position of a first sight pin included in the plurality of sight pins and a second indicia corresponding to a position of a second sight pin included in the plurality of sight pins, the position of the second sight pin established by sighting-in the selected bow and arrow at a first known shot distance; and establishing a distance between a location of the first indicia in the display and a location of the second indicia in the display to allow a user to move the first sight pin into alignment with the first indicia with the second sight pin aligned with the second indicia, the distance placing the first sight pin in a sighted-in position for a second known shot distance when the first sight pin is aligned with the first indicia.

In further embodiments, the distance is a first distance, and the method further includes: including in the archery sight pin alignment tool a third indicia corresponding to a position of a third sight pin included in the plurality of sight pins; and establishing a second distance between a location of the third indicia in the display and the location of the second indicia in the display to allow the user to move the third sight pin into alignment with the third indicia with the with the second sight pin aligned with the second indicia, the second distance placing the third sight pin in a sighted-in position for a third known shot distance when the third sight pin is aligned with the third indicia.

According to another aspect, an electronic display device includes a touch screen display, one or more processors coupled to the display and a computer storage medium storing instructions. The stored instructions, when executed by the one or more processors, cause the one or more processors to perform operations including: presenting an archery sight pin alignment tool in the touch screen display, the sight pin alignment tool providing a graphical representation of positions of the plurality of sight pins relative to one another, respectively; including in the archery sight pin alignment tool at least a first indicia corresponding to a position of a first sight pin included in the plurality of sight pins and a second indicia corresponding to a position of a second sight pin included in the plurality of sight pins, the position of the second sight pin established by sighting-in the selected bow and arrow at a first known shot distance; and establishing a distance between a location of the first indicia in the display and a location of the second indicia in the display to allow a user to move the first sight pin into alignment with the first indicia with the second sight pin aligned with the second indicia using a first touch input, the distance placing the first sight pin in a sighted-in position for a second known shot distance when the first sight pin is aligned with the first indicia.

In still other aspects, a method of employing an electronic display device to establish sight pin location for an archery sight including a plurality of sight pins, the archery sight for use with a selected bow and arrow is provided. In some embodiments, the method includes associating each of the plurality of sight pins with a shot distance, respectively; presenting an archery sight pin alignment tool in a display included in the electronic display device, the sight pin alignment tool providing a graphical representation of positions of the plurality of sight pins relative to one another, respectively; including in the archery sight pin alignment tool at least a first indicia corresponding to a position of a first sight pin included in the plurality of sight pins, a second indicia corresponding to a position of a second sight pin included in the plurality of sight pins, and a third indicia corresponding to a position of a third sight pin included in the plurality of sight pins; and automatically locating the first indicia in the display at a location corresponding to a sighted-in position for the first sight pin for a first known shot distance when a distance separating the second indicia and the third indicia in the display substantially equals a distance separating the second sight pin and the third sight pin in the archery sight when sighted in at a second known shot-distance and a third known shot-distance, respectively, the respective sighted-in positions established for the selected bow and arrow.

In some embodiments, the electronic display device includes a touch screen, and the method includes: sighting-in the bow at the second shot-distance and fixing a location of the second sight pin in the archery sight; sighting-in the bow at the third shot distance and fixing a location of the third sight pin in the archery sight; employing the touch screen to adjust the distance separating the second indicia and the third indicia in the display with at least one of the second indicia and the third indicia aligned with the second sight pin and the third sight pin, respectively; and fixing the distance separating the second indicia and the third indicia in the display when the distance separating the second indicia and the third indicia in the display substantially equals the distance separating the second sight pin and the third sight pin.

According to another aspect, an electronic display device includes a touch screen display, one or more processors coupled to the display and a computer storage medium storing instructions. The stored instructions, when executed by the one or more processors, cause the one or more processors to perform operations including: associating each of the plurality of sight pins with a shot distance, respectively; presenting an archery sight pin alignment tool in the touch screen display, the sight pin alignment tool providing a graphical representation of positions of the plurality of sight pins relative to one another, respectively; including in the archery sight pin alignment tool at least a first indicia corresponding to a position of a first sight pin included in the plurality of sight pins, a second indicia corresponding to a position of a second sight pin included in the plurality of sight pins, and a third indicia corresponding to a position of a third sight pin included in the plurality of sight pins; and automatically locating the first indicia in the display at a location corresponding to a sighted-in position for the first sight pin for a first known shot distance when a distance separating the second indicia and the third indicia in the display substantially equals a distance separating the second sight pin and the third sight pin in the archery sight when sighted in at a second known shot-distance and a third known shot-distance, respectively, the respective sighted-in positions established for the selected bow and arrow, wherein the distance separating the second indicia and the third indicia in the display is established by adjusting the distance separating the second indicia and the third indicia in the display the using at least one touch input.

In another aspect, a method of employing an electronic display device to establish sight pin location for an archery sight including a plurality of sight pins, the archery sight for use with a selected bow and arrow is provided. In some embodiments, the method includes associating each of the plurality of sight pins with a shot distance, respectively; presenting an archery sight pin alignment tool in a display included in the electronic display device, the sight pin alignment tool providing a graphical representation of positions of the plurality of sight pins relative to one another, respectively; including in the archery sight pin alignment tool a plurality of indicia corresponding to the plurality of sight pins, respectively; establishing a distance separating two of the plurality of indicia to correspond to a distance separating two of the plurality of sight pins when sighted in with the selected bow and arrow at a known shot-distance, respectively; in response to establishing the distance separating the two of the plurality of indicia, adjusting a location of each remaining indicia included in the plurality of indicia, relative to the two of the plurality of indicia, to correspond to a sighted-in position of an additional sight pin included in the plurality of sight pins, respectively.

According to one embodiment, the method includes establishing the distance separating the two of the plurality of indicia to substantially equal the distance separating the two of the plurality of sight pins. According to a further embodiment, the method includes automatically adjusting the location of each of the remaining indicia in response to establishing the distance separating the two of the plurality of indicia.

According to another aspect, an electronic display device includes a touch screen display, one or more processors coupled to the display and a computer storage medium storing instructions. The stored instructions, when executed by the one or more processors, cause the one or more processors to perform operations including: presenting an archery sight pin alignment tool in the touch screen display, the sight pin alignment tool providing a graphical representation of positions of the plurality of sight pins relative to one another, respectively; including in the archery sight pin alignment tool a plurality of indicia corresponding to the plurality of sight pins, respectively; establishing a distance separating two of the plurality of indicia to correspond to a distance separating two of the plurality of sight pins when sighted in with the selected bow and arrow at a known shot-distance, respectively; in response to establishing the distance separating the two of the plurality of indicia, adjusting a location of each remaining indicia included in the plurality of indicia, relative to the two of the plurality of indicia, to correspond to a sighted-in position of an additional sight pin included in the plurality of sight pins, respectively, wherein the distance separating the two of the plurality of indicia is established by adjusting the distance separating the two of the plurality of indicia using at least one touch input.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 10A illustrates a user interface presented in a touch display including a plurality of sight marks in accordance with one embodiment;

FIGS. 10B and 10C illustrate the user interface of FIG. 10A with an archery sight in accordance with one embodiment;

FIG. 11 illustrates a flow diagram of process for generating and employing a plurality of sight marks in accordance with one embodiment;

FIG. 12 illustrates a flow diagram of a portion of the process illustrated in FIG. 11 in accordance with one embodiment;

FIG. 13A illustrates a user interface presented in a touch display including a plurality of sight marks in accordance with another embodiment;

FIG. 13B illustrates the user interface of FIG. 13A with a sight tape in accordance with one embodiment;

DETAILED DESCRIPTION

Figure 1:
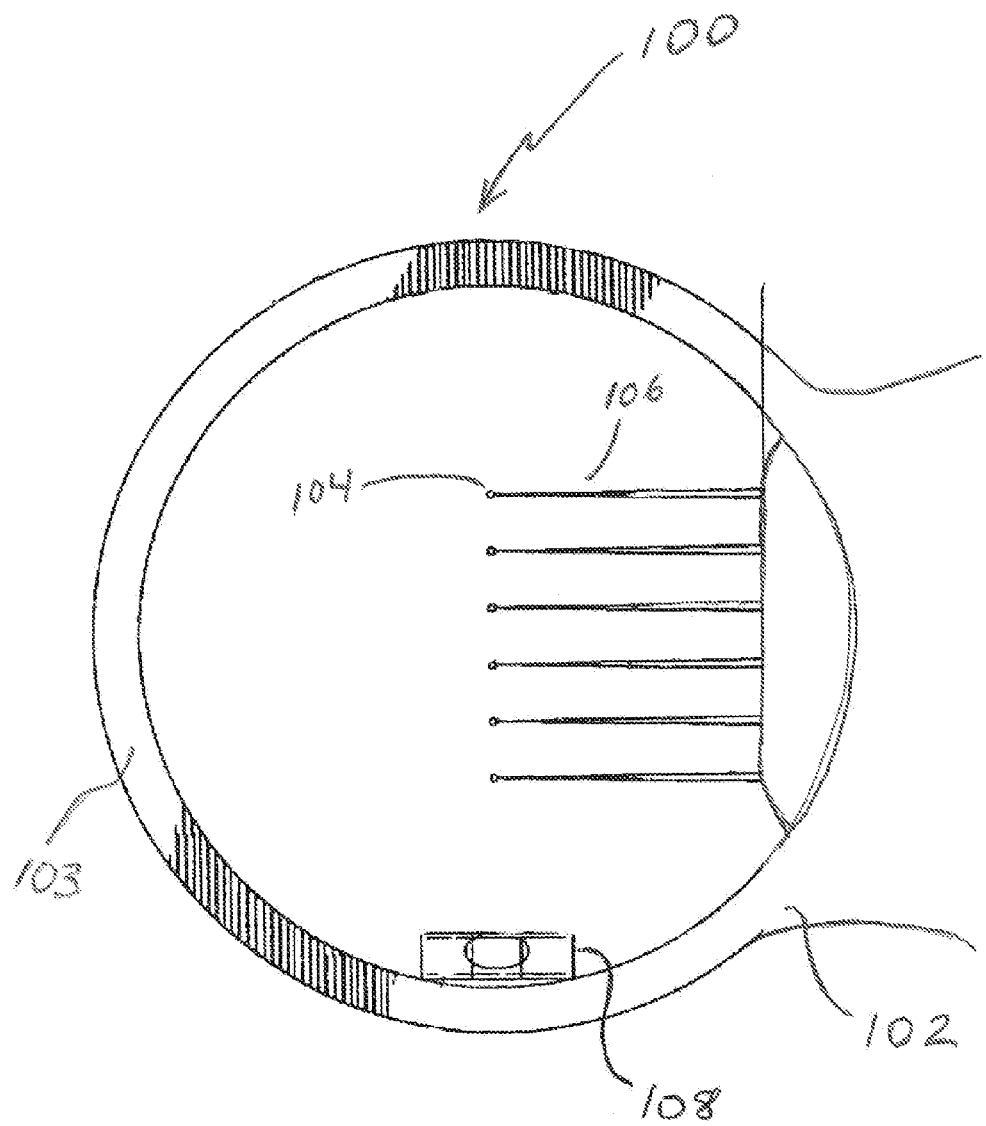
FIG. 1 illustrates a multi-pin pin archery sight of the prior art.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing", "involving", and variations thereof herein, is meant to encompass the items listed thereafter and equivalents thereof as well as additional items.

Referring now to FIG. 1, a prior art multi-pin archery sight 100 is illustrated. The archery sight 100 can be employed in accordance with some embodiments described herein. The sight 100 includes a housing 102 that attaches to an archery bow, for example, a riser portion of the bow. In general, the sight 100 can also include one or more sight pins 104. Further, the housing 102 can include a frame 103 within which the sight pins 104 are located. The frame 103 can protect the sight pins 104 from damage and also provide a visual reference to an archer using a peep sight. In the illustrated embodiment, each sight pin 104 is included at a distal end of the arm 106. Although illustrated as having six pins 104, the sight 100 can include a single pin or any number of sight pins, depending on the embodiment, provided there is sufficient space for the pins. Further, the arm 106 can be oriented horizontally, as illustrated, or vertically as is known in the art. The sight 100 can include a variety of features, for example, the sight 100 can include a level 108. According, to various embodiments, the vertical and/or horizontal positions of the sight pins 104 are mechanically adjusted. According to some embodiments, the location of the sight pins 104 is individually mechanically-adjusted. In further embodiments, the vertical and or horizontal position of the housing 102 is adjustable such that the position of sight pins 104 can moved by moving the position of the housing 102.

For example, the sight pins 104 and/or housing 102 can be secured in position using a setscrew or other mechanical fastener or mechanically operated element (for example, a lever). The precision of the position-adjustment that is available will depend on the embodiment, however, in some embodiments extremely fine adjustments (i.e., micro-adjustments) can be made. As described above, multi-pin sights such as those illustrated in FIG. 1 are sometimes referred to as a fixed pin sight because a pin position is generally not changed once the pin is located for accurate shooting at a particular distance, i.e., sighted-in.

Figure 2:
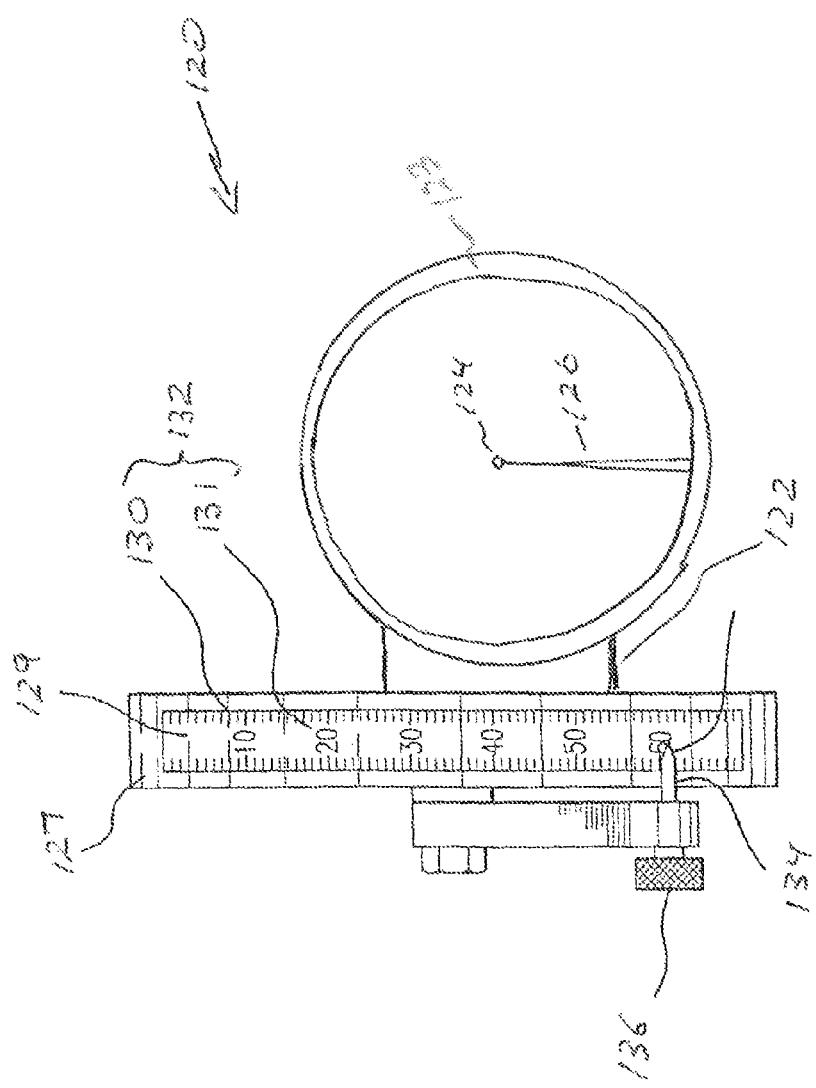
FIG. 2 illustrates a single-pin archery sight of the prior art.

Referring now to FIG. 2, a single pin prior art archery sight 120 is illustrated. The archery sight 120 can be employed in accordance with some embodiments described herein. According to the illustrated embodiment, the sight 120 includes a housing 122, a sight pin 124, an arm 126 and a face 127. Further, the housing 122 can include a frame 123 within which the sight pin 124 is located. The face 127 is designed to receive a sight tape 129 which is glued, taped or otherwise attached to the face 127. Further, the sight tape 129 can include indicia 132 to provide a positional reference concerning the adjustment of the sight 120. Depending on the embodiment, the indicia 132 includes lines 130 and numerals 131 for reference. For ease of use, such indicia 132 generally correspond to distances, for example, where the lines 130 represent one yard (or other distance) increments and the numerals 131 are presented at 10 yard intervals. In the illustrated embodiment, the sight 120 also includes a reference pin 134 and a locking mechanism 136.

In the illustrated embodiment, the locking mechanism 136 includes a thumb-wheel operated set screw, however, other means of releasably securing the position of the sight pin 124 and arm 126 can be used. In some embodiments, the face 127 and the reference pin 134 are located at the end of a lever or other mechanical structure attached to the housing 122 that places the face 127 and reference pin 134 closer to the archer than the location of the sight pin 124. According to these embodiments, the ratio of movement of the reference pin 134 to movement of the sight pin 124 is greater than 1:1.

Approaches for establishing the correct position of the sight pin (for example, the elevation of the sight pin 124 in the housing 122) are described in more detail below. However, in use, adjustment of the position of the sight pin 124 is made by releasing the locking mechanism 136 and moving the adjustable portion of the sight to raise or lower the reference pin 134 until it is aligned with the desired indicia 132. For example, the archer can adjust the sight so the reference pin 134 is moved to align with the 40 yard mark when the archer is about to take a 40 yard shot. Provided the bow is already sighted-in, the preceding adjustment places the sight pin 124 in the proper position for a 40 yard shot. The locking mechanism 136 is then re-secured to maintain the sight pin elevation. As referred to in the preceding sentence, the "proper position" refers to a position that allows the archer to align the sight pin 124 with the center of the bullseye 40 yards away to hit the center of the bullseye with an arrow loosed from the bow.

The approaches described herein with reference to "sight tapes" or "a sight tape" can also be employed with archery sights (for example, the sight 120) in which the indicia (for example, the indicia 132) are placed directly on the sight 120, for example, where the indicia 132 are engraved or otherwise marked on the face 127 or another part of the sight 120. Further, the approaches described herein can be employed with a sight that has a first fixed set of indicia placed on the face (including versions where the face is placed on a wheel or other arcuate surface) and a second related set of indicia spaced on an adjusted arm that varies the distance of the face from the sight pin 124. Accordingly, one of skill in the art will recognize that aspects and embodiments can be employed with an archery sight 120 that does not include any removable "tape" or other removable marking material. Further, the archery sight 120 can include a plurality of sight pins within the housing 122 such that movement of moveable portion of the housing 122 raises or lowers the plurality of sight pins together.

Figure 3:
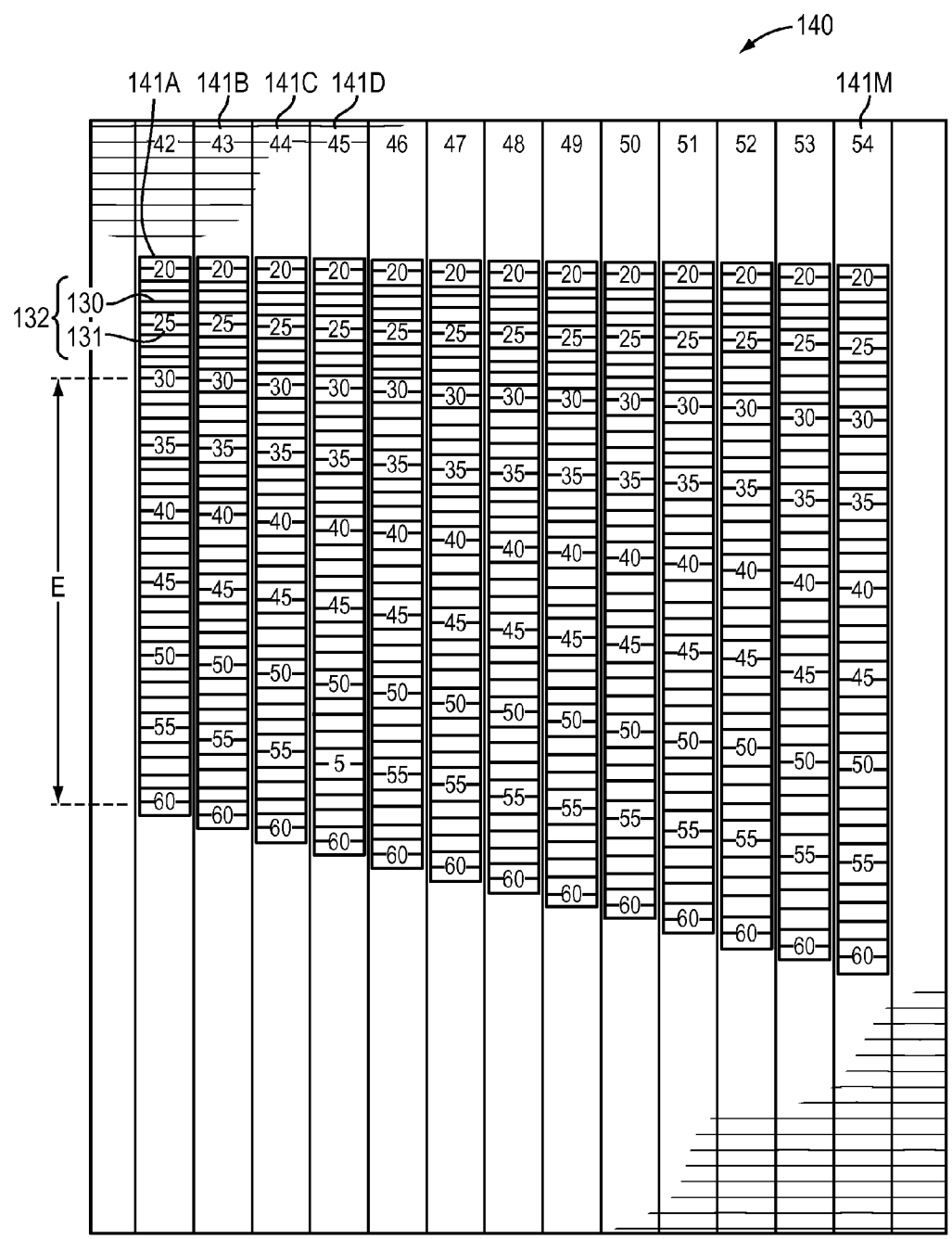
FIG. 3 illustrates sight tapes for the archery sight of FIG. 2.

Referring now to FIG. 3, a set 140 of sight tapes is illustrated where the set includes a plurality of sight tapes 141 for use with the archery sight 120. The set 140 can be employed in accordance with some embodiments described herein. In the illustrated embodiment, the set includes a total of 13 separate sight tapes beginning with the rightmost sight tape 141A, then sight tape 141B, sight tape 141C, sight tape 141D and, continuing to move to the far right the $13^{th}$ sight tape 141M. According to one embodiment, the set of sight tapes 140 are adhesive backed to allow a peel and stick removal from the set and attachment to the sight, for example, the face 127 of the sight 120. Further, each of the plurality of sight tapes 141 includes indicia 132 including lines 130 and numerals 131.

In the illustrated embodiment, each of the plurality of sight tapes 141 includes an identification numeral that uniquely identifies the sight tape (for example, sight tape 141A and identification number "42") relative to other sight tapes included in the set 140. In general, the indicia 132 are more closely grouped together for the faster shooting bow/arrow combinations. The amount of the arrow drag also contributes to speed at which an arrow travels downrange. Drag can be affected by the arrow physical characteristics and the amount of stability the arrow exhibits in flight. Thus, for an arrow having a lower drag relative to another arrow, the indicia may also be closer together relative to spacing of indicia for an arrow with high drag. The preceding may be true where the two arrows launched from a bow at the same speed and in some cases where the higher drag arrow launched at a faster speed (for example, where the same type of arrow is fletched with feathers, higher launch speed but also higher drag result relative to the same type arrow fletched with plastic vanes).

The following provides an example of the advantage of employing an arrow drag to determine the change in elevation that occurs with changes in shot-distance. The approach can be employed to precisely determine arrow trajectory at any point of flight. For the following example, the arrow drag coefficient is 1.5 g, the launch velocity is 240 ft/sec and the zeroed distance is 50 yards.

TABLE 1

V1 = 240 fps, drag coef A = 1500 mg

| | | with known drag | | with estimated drag | |
|---|---|---|---|---|---|
| D[yard] | D[m] | T[ms] | h[ft] | T[ms] | h[ft] |
| 40 | 36.576 | 529.08 | 2.81 | 500.36 | 2.26 |
| 45 | 41.148 | 599.81 | 1.50 | 562.90 | 1.19 |
| 50 | 45.72 | 671.74 | 0.00 | 625.44 | 0.00 |
| 55 | 50.292 | 744.92 | −1.70 | 687.99 | −1.33 |
| 60 | 54.864 | 819.42 | −3.61 | 750.53 | −2.77 |

Table 1 illustrates that accuracy can be increased by one half a foot or more with the use of known arrow drag in this example. Further, the benefits increase with for arrows that have an increased drag coefficient. Table 2 illustrates that the accuracy of the elevation estimates can be further increased by a minimum 3-4 inches for arrows with higher drag coefficients compared with estimates that do not employ a known arrow drag.

TABLE 2

V1 = 240 fps, drag coef A = 2500 mg

| | | with known drag | | with estimated drag | |
|---|---|---|---|---|---|
| D[yard] | D[m] | T[ms] | h[ft] | T[ms] | h[ft] |
| 40 | 36.576 | 552.57 | 3.31 | 500.36 | 2.26 |
| 45 | 41.148 | 630.98 | 1.79 | 562.90 | 1.19 |
| 50 | 45.72 | 712.17 | 0.00 | 625.44 | 0.00 |
| 55 | 50.292 | 796.46 | −2.08 | 687.99 | −1.33 |
| 60 | 54.864 | 884.23 | −4.50 | 750.53 | −2.77 |

Referring again to FIG. 3, the set 140 includes the sight tape 141A with the indicia 132 located most closely together and the sight tape 141M with the indicia 132 located furthest apart. In FIG. 3, the distance E is a distance that separates two known distances on a sight tape, for example, the distance between the 30 yard indicia and the 60 yard indicia on the sight tape 141A. The distance E, between 30 and 60 yard indicia is smallest on the sight tape 141A and largest on the sight tape 141M. As is described below, the distance E or another distance between known indicia that appear on each of the sight tapes 141 in the set 140 can be used as a reference pair of indicia to select a sight tape for a given bow/arrow combination. For example, in another embodiment, a distance between the 20 yard indicia and the 50 yard indicia can be used.

According to some other embodiments, the set 140 of sight tapes 141 is a set of setup tapes which are used to select an actual sight tape.

Figure 4:
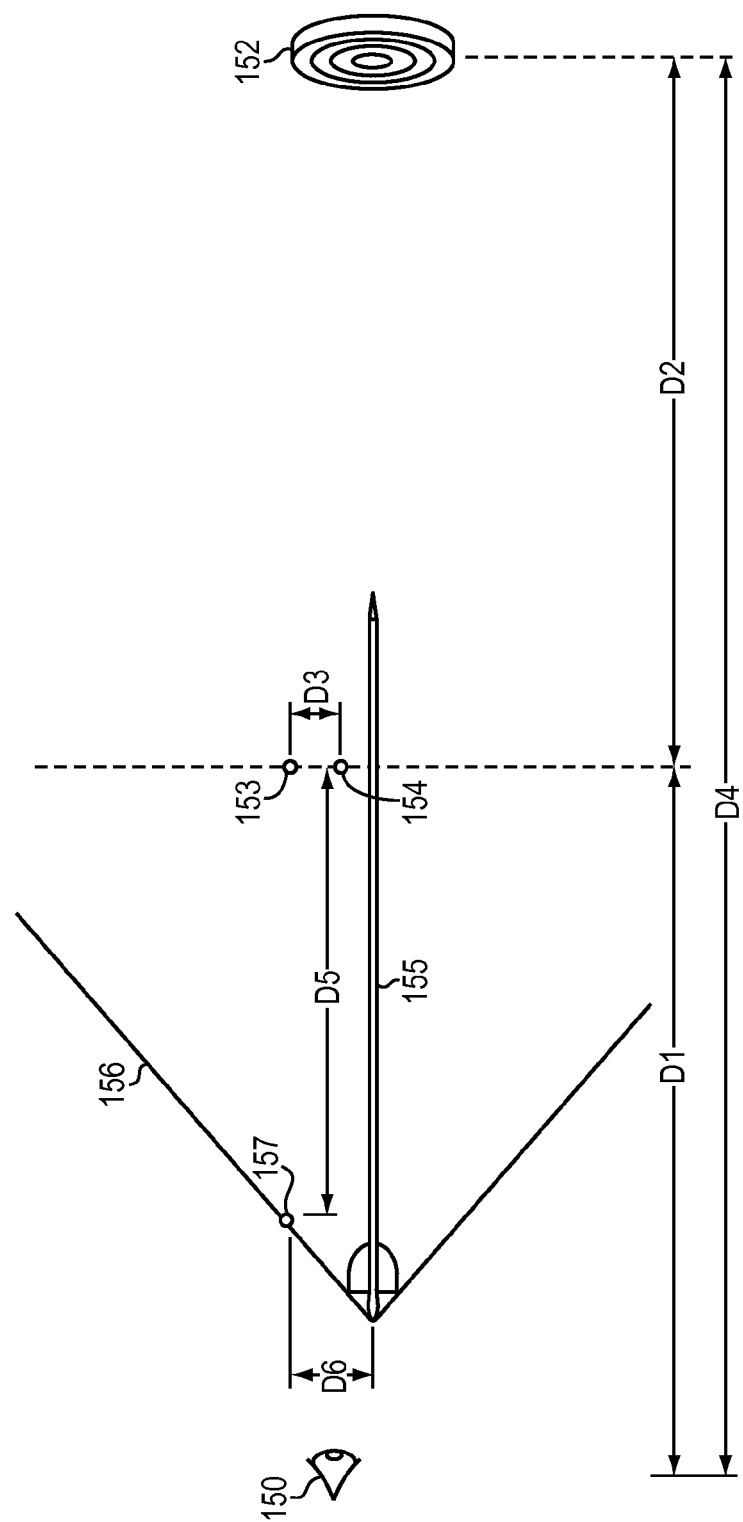
FIG. 4 illustrates a set of reference points for an archery sighting-in process in accordance with one embodiment.

FIG. 4 provides a simplified diagram to illustrate the relationship between some of the reference points used in setting an archery sight. For clarity, the bow and the sight housing are not illustrated. In FIG. 4, an eye 150 of an archer is presented relative to an archery target 152, a first sight pin position 153, a second sight pin position 154 and an arrow 155. Further, the bow includes a peep sight 157 located on a string 156 of the bow. An arrow 158 nocked on the bow with the bow at a full draw position is included for reference. According to various embodiments, one or more sight pins are included in an archery sight attached to a riser of the bow. Where a fixed pin sight is employed the first and second sight pin positions 153, 154 can be established with two different sight pins. Where a multi-pin sight is employed the first sight pin position 153 and the second sight pin position 154 can be established by adjusting a position, for example, an elevation, of a single pin included in the sight.

In FIG. 4, the distance D1 approximately corresponds to a draw length of the archer, the distance D2 approximately corresponds to a shot-distance (i.e., a distance from where the archer stands to the target 152), and the distance D4 is the distance from the archers eye, when taking aim with the bow mounted archery sight, to the target 152. Often, the peep sight 157 provides an additional reference (an aid in properly aligning the archers eye 150, the archery sight and the target 152) or other aid is located between the archer's eye 150 and the sight pins of the sight. In the illustrated embodiment, the distance D5 is the distance between the peep sight 157 and the archery sight where the sight pin positions 153, 154 are located. The distance D6 is the distance between the peep sight 157 and the arrow The distance D3 is the distance (for example, a difference in elevation) that separates the first sight pin position 153 and the second sight pin position 154 from one another. Various embodiments described herein determine the distance D3 between sight pin positions, for example, the distance between a pin for which the archer has sighted in the bow (either the first sight pin position 153 and the second sight pin position 154) to one or more different sight pin positions. The distance D3 can also be referred to as a "pin gap."

Figure 5:
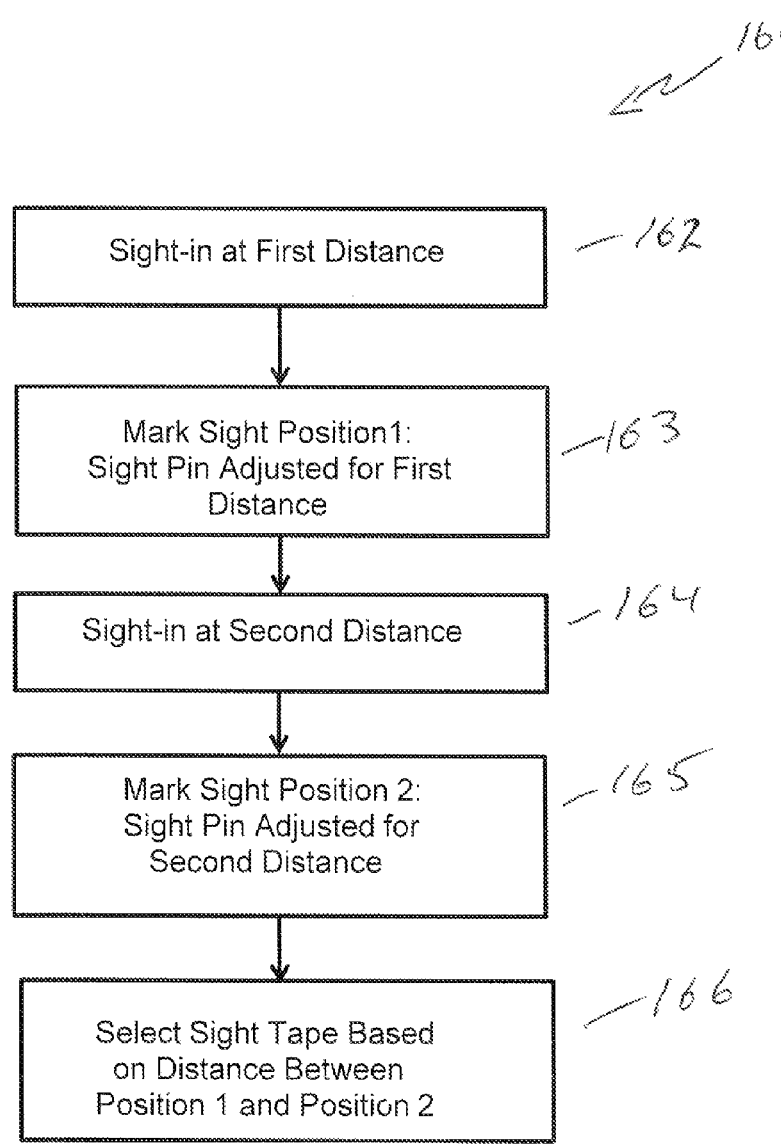
FIG. 5 illustrates a sight-tape selection process of the prior art.

Some embodiments described herein provide an approach to establish accurate sight marks for sight pin elevation/position following shot(s) being taken at only a single distance. According to some embodiments, the single distance is less than 40 yards. In one embodiment, the single distance is 20 yards because 20 yards is almost universally available at indoor archery ranges. In addition, where a sight tape is used, some embodiments described herein provide approaches to select the correct sight tape following shot(s) being taken at only a single distance. In some embodiments, arrow drag is employed to facilitate each of the preceding embodiments. Further, in some embodiments, the arrow drag is directly measured using a sensing system included in the arrow when shot from the bow. In other embodiments, arrow drag is estimated, for example, based on an identification of the archery equipment for which the sight marks are being established. In still other embodiments, sight marks are established without the use of arrow drag. This is in contrast to prior approaches in which a sight tape cannot be selected without sighting in at a minimum of two distances, for example, as illustrated in FIG. 5. According to other embodiments, the apparatus, system and methods described herein generate accurate sight marks for one or more sight pin/elevations following shot(s) being taken at multiple distances. Each of the preceding embodiments can be accomplished using a graphical user interface of an electronic device.

Further, embodiments of an archery sight setting application as described herein can provided multiple approaches for establishing archery sight settings using different combinations of archery parameters, respectively. For example, in one embodiment, the archery parameters include archery equipment setting parameters (for example, peep-to-sight and peep-to-arrow measurements) and archery equipment performance parameters (for example, arrow launch speed). According to these embodiments, a plurality of sight marks are generated with the preceding information. In a further embodiment, improved precision is achieved by also including arrow drag in the archery performance parameters used to generate the plurality of sight marks. According to one embodiment, a measured arrow drag is employed. According to another embodiment, arrow drag is calculated based on information concerning arrow launch speed and/or arrow type (for example, a shaft type, a fletching type and/or a shaft diameter).

In an alternative embodiment, a plurality of sight marks are generated based solely on archery equipment selection parameters (for example, make and model of the bow and arrow, draw weight and draw length) and a limited amount of equipment setting information (for example, the peep-to-arrow and peep-to-sight measurements). In general, this embodiment does not provide the degree of precision as the approaches described in the immediately preceding paragraphs. In still another embodiment, the archery sight marks are generated with the archery equipment selection parameters but without use of measured dimensions of the peep sight. Instead, the equipment setting information may either not be used or be estimated from the archery equipment selection parameters.

Figure 6:
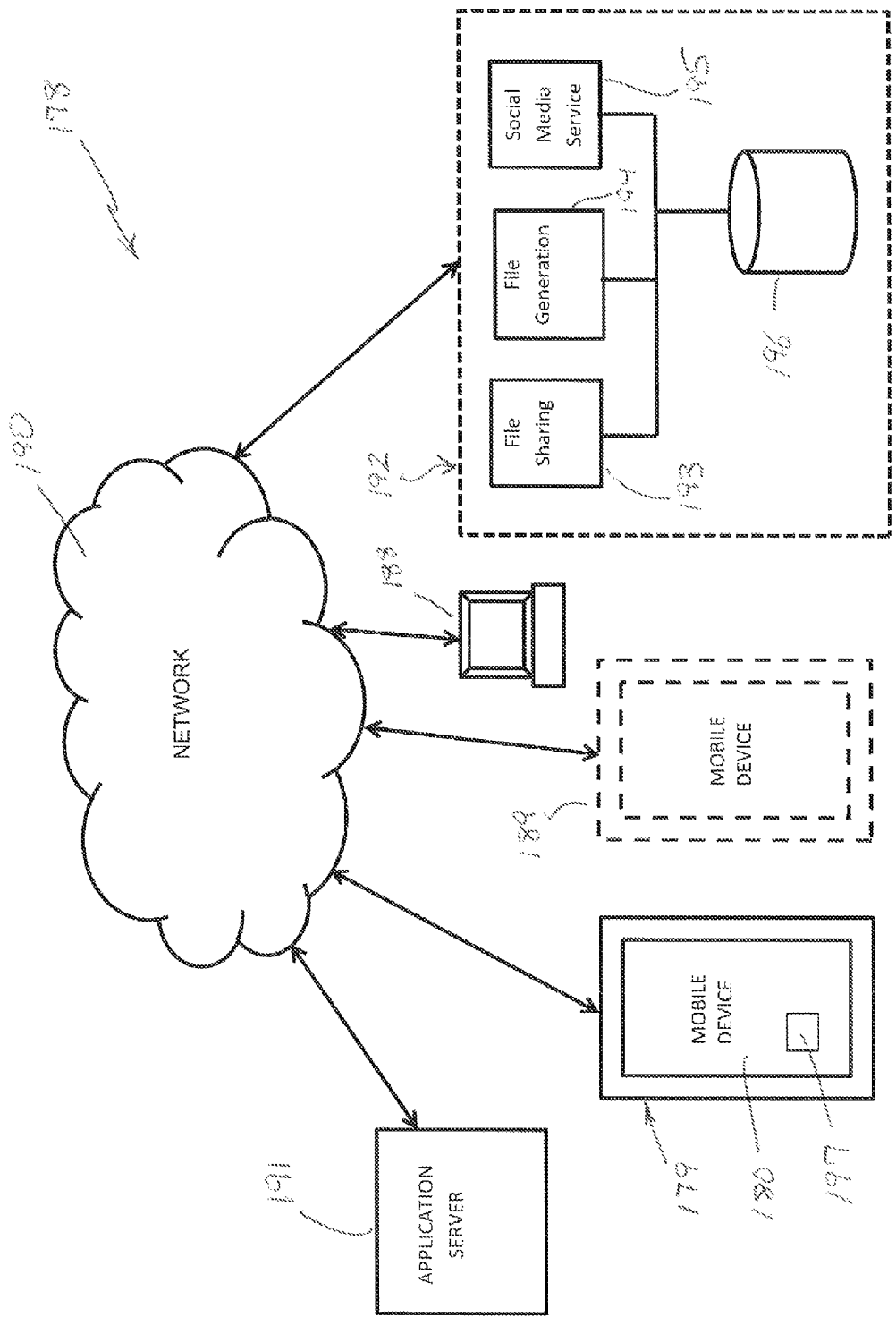
FIG. 6 illustrates a system including a network operating environment for a device in accordance with one embodiment.

Referring to FIG. 6, a system 186 including a network operating environment for a device 187 that can be used to create archery sight-settings is illustrated in accordance with various embodiments. In accordance with the illustrated embodiment, the system includes a mobile device 187, a stationary device 188, additional user devices 189, a network 190, an application server 191 and services 192, for example, services and/or resources remotely accessible by the devices 187, 188, 189 for use in generating archery sight-settings. In the illustrated embodiment, the services 192 include file sharing resources 193, sight-mark generation services 194, social media service 195 and one or more databases 196. The services 192 and resources are described in more detail herein. As should be apparent to one of ordinary skill in the art in view of the disclosure provided herein, the services 192 can include other services and/or resources and combinations of services and/or resources depending upon the embodiment.

In general, the network 190 can include either or both of local-area networks (LANs), wide area networks (WANs), wireless communication, wired communication and may include the Internet. According to a further embodiment, the network 190 provides access "over-the-cloud" to one or more remote devices, servers, application resource management and/or data storage systems. For example, the network 190 can allow communication between any of the mobile device 179, the stationary device 188, and the other user devices 189 with one another and/or with any of the other resources and devices coupled to the network 190. Communication can occur using any of Wi-Fi networks, Bluetooth™ communication, cellular networks, satellite communication, and peer-to-peer networks available either alone or in combination with one another via the network 190. Other communication protocols and topologies can also be implemented in accordance with various embodiments. According to some embodiments, a plurality of the end user devices 179, 189, for example, mobile computing devices, and stationary devices 188 suitable for generating archery sight-settings communicate with and/or access the application server 191 and services 192 via the network 190.

According to various embodiments, the mobile device 179 and the other user devices 189 can be, for example any of a portable device such as a tablet computer, a hand-held computer, a personal digital assistant, a cellular telephone, a camera, a smart phone, and enhance general packet radio service (EGPRS) mobile phone, a media player, a navigation device, an e-mail device, a game console, a laptop computer, or a combination of any two or more of these processing devices and/or other processing devices. In one embodiment, the stationary device 188 is a desktop computer or other device having limited or no mobility but suitable for creating archery sight-settings for viewing, sharing and/or printing.

As is described in more detail with reference to FIG. 8, the device 179 can include a general purpose processor (CPU), a graphics processing unit (GPU), a memory, a display 180 (for example, a touchscreen) and additional processing devices, for example, a compression/decompression module and/or a communication module. The device 179 may have a plurality of input/output interfaces and devices such as a mouse, a joystick, a touchscreen, a keyboard etc. Further, the device 179 may include any one or any combination of peripheral devices, for example, a positioning system, an RF transceiver, a motion sensor, a light sensor, a proximity sensor, one or more additional sensors, a camera, communications hardware and an audio including the speaker and/or annunciators.

In various embodiments, the devices 179, 188 and 189 can communicate with one or more services and/or resources via the network 190. In some embodiments, the services can include tools and resources that facilitate the generation of archery sight-settings.

In some embodiments, the display 180 is configured to present a user interface to a user of the device 179, for example, a graphical user interface (GUI). The display 180 can include OLED technology, LCD technology, light emitting polymer display technology or other display technology suitable for presenting information to a user in a visual format. According to some embodiments, the display 180 is touch screen display. According to these embodiments, the display 180 is sensitive/responsive to input selections made by the user contacting the face of the display 180. According to one embodiment, the display 180 includes haptic display technology. According to some embodiments, the display 180 is sensitive to touch inputs received in proximity to, but not actually in contact with the display 180. In accordance with further embodiments, the device 179 can also include one or more additional touch-sensitive surfaces such as a trackpad or touchpad. In various embodiments, the device 179 can also include additional I/O devices such as push-buttons and/or switches that are operable by the user.

According to some embodiments, the display 180 is responsive to multiple touch inputs applied simultaneously to the display by the user. According to these embodiments, the device processes the multiple inputs based on any of the pressure, degree, and/or position of each point of the inputs. Further, the device can process touch input based on the length of a stroke and/or swipe. These embodiments can allow for a wider range of touch inputs to be employed by the user. According to other embodiments, the device 179 can include a display in which contact is made using a stylus or other pointing device.

In general, the device 179 can display one or more graphical user interfaces on the display 180 to provide the user access to various system objects (for example, a display object 197) and for conveying information to the user. In the illustrated embodiment, the display object 197 is a graphic representation of objects employed in a system used to generate archery sight-settings. A non-exhaustive list of examples of such system objects include device functions such tools for: selecting one or more archery parameters that affect arrow flight; parameters concerning archery sights or other archery equipment (for example, where an archery parameter can include values represented as discrete values, charts, plots, graphs, etc.); generating, applying and modifying sight marks; creating, sharing and/or printing files (for example, image, text or data files); alerts, events or other visual references represented graphically. Accordingly, one or a plurality of icons can be rendered for viewing and/or selection in the display 180 via either a touch input or other input such as a cursor rendered in the display.

In general, the system 178 provides tools and functionality accessed by the mobile devices 179, stationary devices 188 and other user devices 189 to allow users of the devices to generate archery sight settings and/or to share archery sight settings. According to some embodiments, the user employs the mobile device 179, stationary device 188 or other user devices 189 to access and/or download one or more tools from the services 192 to the respective device (179, 188, 189) where the tools are employed to create, edit and/or share the archery sight-settings.

According to some embodiments, the tools are provided in an application that the user downloads to the device. For example, the application can be downloaded from the application server 191. According to some embodiments, the application server 191 is hosted by a third party service, for example, in an application store or other digital application distribution platform from which other applications unrelated to the archery sight-setting application can also be accessed and downloaded (well-known current examples include the iOS App Store operated by Apple, the Amazon App store and Google Play). According to other embodiments the application server 191 is provided by the entity that hosts the services and resources included in the services 192. Accordingly, in some embodiments the application server 191 is integrated into the services 192. In further embodiments, the system 178 allows updates to the archery sight-setting application and other software to be "pushed" to any of the devices 179, 188 and 189 from either or both of the application server 191 and the services 192.

According to the illustrated embodiment, the user further employs the device to access additional resources to share archery sight-settings with other users of the service 192, for example, via social media resources included in the services 192 or provided by a third-party. For example, the social media service 195 can allow for the sharing of archery sight-settings via Facebook, Twitter, Instagram, the provider of the host application and services 192 and/or other social networks. In a further embodiment, the services 192 and social media service 195 allow the archery sight-settings to be shared via a blog, for example, Tumblr.

According to some embodiments, the file sharing resources 193 generate a different file type with which to share depending on the manner and/or type of device (180, 188, 189) on which the archery sight setting will be shared. In one example the archery sight-setting is stored in a format compatible with a variety display resolutions, for example, to maintain the scale of the sight setting when shared across a variety of types of mobile devices. According to one embodiment, the archery sight-setting includes a plurality of sight marks that are scaled to provide a 1:1 ratio of distance as measured between sight marks when display in the mobile device and distance as measured between sight positions of an archery sight for which the sight settings are generated. According to these embodiments, the file sharing resources generate a file for the end-user device on which the sight-marks are to be displayed such that the sight marks are rendered to provide the 1:1 ratio (for example, without use of a zoom operation).

According to various embodiments, the file generation service 194 provides users with the resources, for example, applications that can be downloaded to the devices 179, 188, 189. In some embodiments, the applications provide the tools and functionality that allow the user to generate a sight setting tool and deliver sight-marks in the display using the mobile device 179, stationary device 188 and other user devices 189.

According to some embodiments, the one or more databases 196 store user identification information (for example, user IDs and passwords), user content (for example, sight-settings that are saved at the services 192), other information associated with the user such as their social network/contacts and/or other preferences. Depending on the embodiment, the database 196 can include any of a relational database, object-oriented database, unstructured database, or other database. Further, the database 196 can be included in any aspect of a memory system, such as in RAM, ROM or disc, and may also be separately stored on one or more dedicated data servers included in the services 192.

In various embodiments, the mobile device 179 and the stationary device 188 can implement one or more of a variety of operations associated with the generation and/or sharing of archery sight settings. According to some embodiments, the devices 179, 188, 189 can present a graphical user interfaces in a display, for example, in the display 180. According to these embodiments, the device responds to inputs received from a user, for example, through the touch-sensitive display. For example, a user can select various operations by launching one or more applications on the device by selecting one of the display objects presented in the display 180. According to alternate embodiments, the user can select operations in other ways including, for example, using one of user-selectable menus included in the user interface. Once an application has been selected, one or more windows or pages corresponding to the application can be displayed on the display 180 of the mobile device 179 or the stationary device 188, for example, via a graphical user interface presented in the display. In embodiments where a touch display is employed, the user can navigate through the windows or pages by selecting appropriate places on the display 180. In other embodiments, the user can navigate through the windows or pages using a cursor rendered in the graphical user interface, for example, the cursor can be positioned using a mouse, touchpad or other input device. In further embodiments, the application can be accessed and navigated to generate, view, modify and/or share archery sight setting voice commands where the device 179, 188, 189 includes a speech recognition system.

Figure 7:
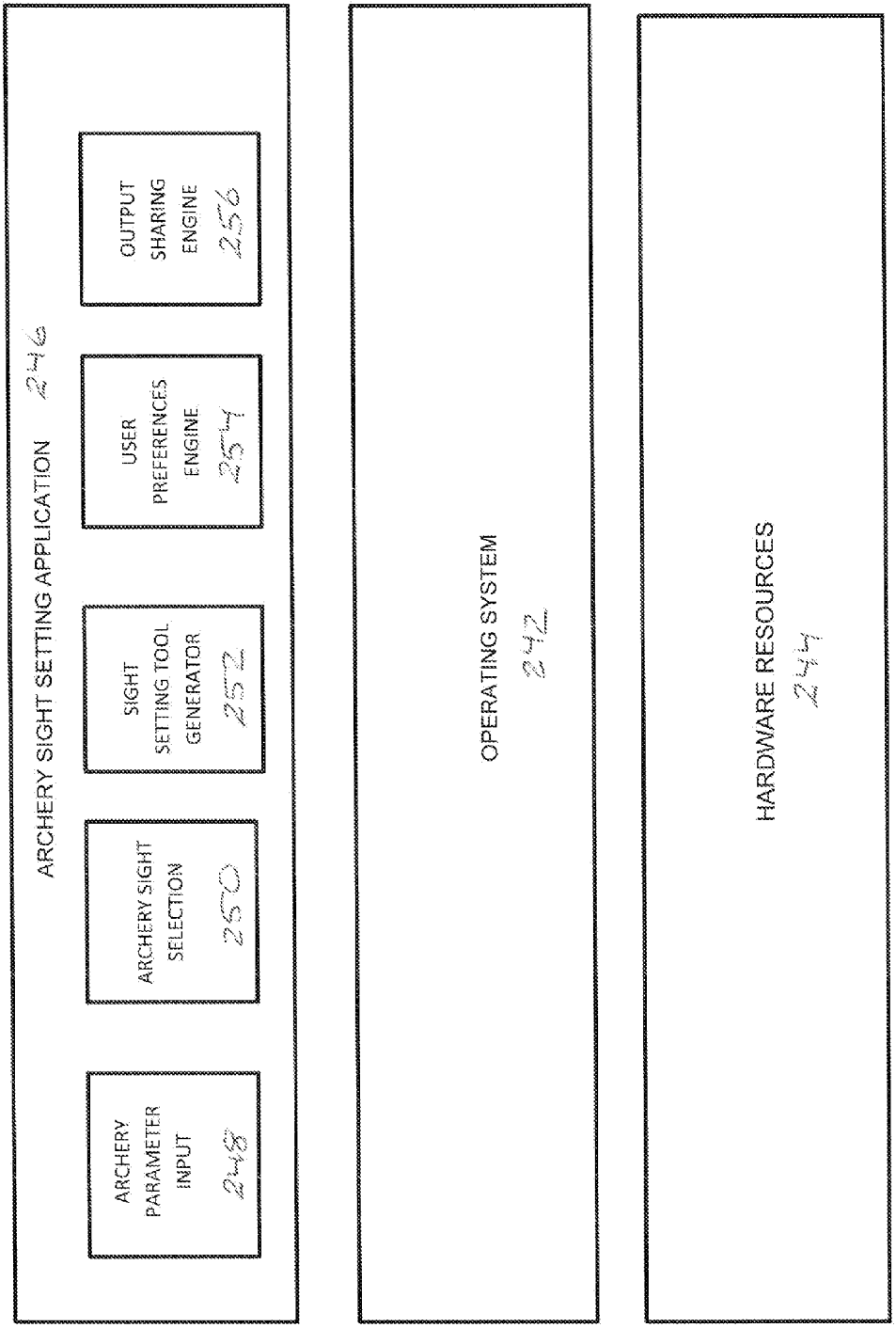
FIG. 7 illustrates a hierarchy for a device in accordance with one embodiment.

FIG. 7 illustrates a hierarchy 240 for generating and sharing archery sight-settings in accordance with various embodiments. In the illustrated embodiment, the hierarchy 240 includes an operating system 242, hardware resources 244 and an archery sight-setting application 246. In general, the archery sight-setting application 246 is implemented in accordance with an application programming interface (API) to communicate via the operating system to the various hardware resources and user interfaces available with the device 179. According to various embodiments, the APIs can be a set of APIs that are usually included with operating systems (for example, Linux or UNIX APIs), as well as APIs specific for sending and receiving data via I/O devices such as the display in which a GUI is presented to the user for use in creating and sharing archery sight-settings.

As will be apparent to one of ordinary skill in the art in view of the disclosure herein, the archery sight-setting application 246 can be configured for operation with a variety of operating systems 242 and associated hardware resources 244. For example, the archery sight-setting application 246 can be configured for operation with Apple iOS, Google's Android, RIM's BlackBerry OS and Microsoft Windows Phone. The preceding provide some examples and the archery sight-setting application 246 can be configured for operation with other operating systems.

Operating system 242 provides an interface to the hardware resources 244 for example the display employed to render a GUI for operation of the archery sight-setting application 246. Accordingly, the operating system 242 can support a variety of displays including touch displays and other user interfaces. According to further embodiment, the operating system 242 can also communicate with other hardware such as communication interfaces (e.g., a cell phone), cameras, audio hardware, location systems such as GPS and other I/O devices using device drivers. The operating system 242 can also communicate with hardware processing modules such as the graphics processing unit and/or the central processor executing operations and/or instructions during the archery sight-setting generation process.

Archery sight-setting application 246 can be an archery sight-setting application executing on a device such as the mobile devices 179, stationary device 188 and other user devices 189. Archery sight-setting application 246 can include an archery parameter input module 248, an archery sight selection module 250, a sight-setting tool generator 252, a user preferences engine 254 and an output sharing engine 256. These components can be communicatively coupled to one or more of each other. Though the components identified above are described as being separate or distinct, two or more of the components may be combined in a single process or routine. The functional description provided herein includes the separation of responsibility for distinct functions as an example. Other groupings or other divisions of functional responsibilities can be made as necessary or in accordance with design preferences. For example, in one embodiment, the functionality provided by the archery parameter input module 248, the archery sight selection module 250, and/or the sight-setting tool generator 252 can be combined in a single process.

According to various embodiments, the archery parameter input module 248 is employed by a user to provide information concerning an identification of archery equipment, archery equipment settings and/or archery equipment performance for use in creating archery sight-settings. According to one embodiment, the archery parameter input module 248 can also be used to present display objects, for example, the display object 197, or other objects employed by the user to select one or more archery parameters used to create archery sight-settings. The functionality of the archery parameter input module 248 is described in further detail herein.

According to some embodiments, the archery sight selection module 250 receives inputs selected by user to adjust the quantity of sight marks and/or shot-distances for which sight-marks are generated. The input selection process is described in further detail herein. However, in general, the archery sight selection module 250 operates to process the selected information and so that the displayed sight-marks correspond to the sight pin quantities (for multi-pin sights) and shot-distances for which the user would like sight marks provided because these choices are often specific to an individual archer and/or individual set of archery equipment. According to one embodiment, the archery sight-setting application 246 generates an initial set of sight marks based on default values (for example, a 5 pin sight with pins beginning at a 20 yard shot-distance and then separated from adjacent pins in 10 yard increments). The archery sight selection module is used to process follow-on inputs by the user to customize the default values for their particular situation such that an updated set of sight-marks is generated and displayed in the device 179, 188, 189. According to various embodiments, the archery sight selection module operates in substantially real-time such that the user does not see a noticeable delay between their selection of a new archery sight parameters and the display of sight marks updated in response to the selection.

According to various embodiments, the sight setting tool generator 252 presents the sight-setting tool in the display along with display objects that provide one or more tools or functionality to allow the user to generate sight settings, for example, a set of sight-marks. For example, as touch inputs are received, the sight setting tool generator 252 can modify the display objects or images presented to the user in the display 180. Accordingly, the sight setting tool generator 252 can present icons or other display objects to receive a user's inputs to select the preceding options for generating, customizing, saving, printing and sharing the archery sight-settings as selected by the user.

According to some further embodiments, the user preferences engine 254 receives and stores user preferences used, for example, used by the archery sight selection tool 250 and/or the sight setting tool generator 252 to configure the archery sight setting tool displayed in the GUI. Accordingly, the user preferences engine can provide the information used to display a sight-tool format (multi-pin or single pin), a selected number of sight pins, a selected zeroed shot distance, a selected increment for the yardage marks displayed, and the ranges and functionality of information and display objects to allow the user to customize the archery sight-setting tool.

According to still further embodiments, the output sharing engine 256 receives one or more user inputs to define whether, and if so, how the sight-settings are shared. According to some embodiments, user inputs can include a title, a tag (i.e., a description), selection of a geo-tag, and/or selection to share via one or more social media services. Accordingly, the output sharing manager 256 can provide one or more display objects in the display 180 and received one or more touch inputs as the user's selections and preferences.

Figure 8:
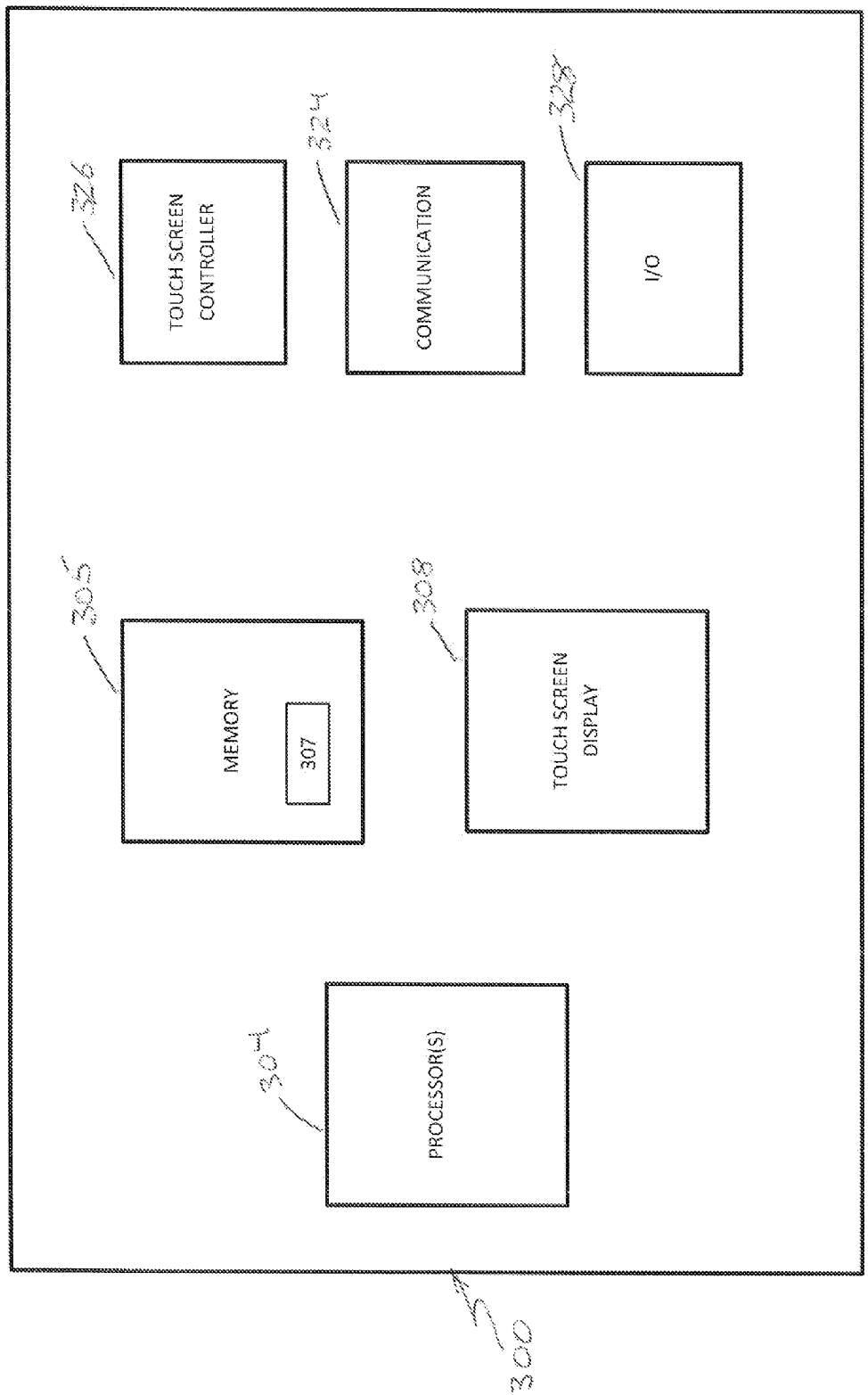
FIG. 8 illustrates a block diagram of a hardware architecture for a device in accordance with one embodiment.

FIG. 8 illustrates a block diagram of hardware architecture of a device 300 for use in archery sight-setting generation in accordance with one embodiment. Depending on the embodiment, the hardware architecture illustrated in FIG. 3 can be included in the mobile device 179, the stationary device 188 or other user devices 189. In the illustrated embodiment, the device 300 includes one or more processors 304 (for example, a central processing unit (CPU), and/or a graphics processing unit (GPU) or other specialized processor), a memory 305, and a touch screen display 308. The memory 305 is configured to store software instructions 307 in accordance with various embodiments. The device 300 can also include communication systems 324 (for example, a cellular phone, Bluetooth, etc.) and a touch screen controller 326. According to some embodiments, the touch screen controller 326 is suitable for use with the touchscreen display 308, or alternatively, a trackpad used to move a cursor within a GUI. Further, the device 300 can include peripheral and/or I/O devices 328 including any of a location and/or positioning device (for example, a GPS to determine location information associated with the device 300), a camera (for example, a video camera) and audio systems (for example, a microphone and/or speakers) as some examples. In some embodiments, I/O 328 can include a mouse used to move the cursor within the GUI. According to further embodiments, an audio system can be employed with a speech recognition system to allow hands-free interaction with the GUI.

The components included in the device 300 can be coupled by one or more communication buses or signal lines. The communication buses can be used for the communication of instructions/commands and data between the illustrated components and between the illustrated components and other components included in the device depending on the embodiment.

In various embodiments, the communication system 324 can include one or more wireless communication subsystems and one or more wired communication subsystems. Wireless communication systems can include RF communication systems and/or optical communication systems such as IR communication systems. The RF communication systems can provide for local communication such as via Bluetooth™ communication and/or long-distance communication, for example, via cellular and/or satellite communication networks.

The device 300 can also support hardwired communication systems in some embodiments, for example, communication via USB or other hardwired communication port included in the device 300. Depending on the embodiment, the hardwired communication can allow the device 300 to communicate with any of an electronic archery accessory such as those described in the '273 patent, a personal computer, a printer, a display screen, a router or other processing devices capable of receiving and/or transmitting voice or data.

In general, the device 300 is not limited to any specific communication hardware and/or protocol. Thus, for example, the communication systems can support any of a (GSM) network, a GPRS network, an enhanced data GSM environment (EDGE) network, 802.x communication networks (e.g., Wi-Fi, WiMax, or 3G networks), code division multiple access (CDMA) networks, a Bluetooth™ network, or other communication network depending on the embodiment.

According to one embodiment, the touchscreen display 308 can detect contact and movement or break thereof using any of a number of touch sensitivity technologies, including but not limited to capacitive, resistive, infrared, and surface acoustic wave technologies, as well as other proximity sensor arrays or other elements for determining one or more points of contact with display 308 or proximity to the display. According to one embodiment, display 308 can be used to implement virtual or soft buttons and/or a keyboard or other display object 197.

According to various embodiments, the I/O devices 328 can include one or more buttons, rocker switches, thumbwheel, infrared port, USB port, and/or a pointer device such as a stylus.

In various embodiments, the memory 305 can include high-speed random access memory and/or non-volatile memory, such as RAM, EEPROM, flash memory magnetic storage devices and optical storage devices. In further embodiments, the memory 305 can store operating system such as, LINUX, UNIX, OS X, iOS, Android, bada, BlackBerry OS, Symbian OS, WINDOWS, WINDOWS phone for mobile, S40 (Series40) or any other OS operating on a mobile device or a stationary device. The operating system can include instructions for handling basic system services and for performing hardware dependent tasks. As mentioned above, the archery sight-setting application can be configured for a specific operating system in a selected embodiment.

In various embodiments, the memory 305 can also store communication instructions to facilitate communicating with one or more additional devices, one or more computers and/or one or more servers, for example, as described with reference to FIG. 6. In some embodiments, the memory includes instructions for rendering the graphical user interface in the display 180, for example, where the graphical user interface can be employed by the user to create and share archery sight-settings. According to these embodiments a variety of additional instructions can be included in the memory 305. For example, software instruction 307 can be provided for a variety of web browsing, media processing, telecommunications, camera and video related functions and GPS-enabled operations as some examples in addition to software instructions specifically related to the archery sighting functions.

Depending on the embodiment, the software instructions 307 can be implemented as individual software programs or modules, or combined with one or another in various configurations. Also depending on the embodiment, various functions of device 300 can be implemented in hardware and/or in software, including in one or more signal processing and/or application specific integrated circuits.

The hierarchy illustrated in FIG. 7 and the device architecture illustrated in FIG. 8 provide examples in accordance with some embodiments. However, the hierarchy 240 can include more or different software elements and/or modules alone or in combination with those illustrated and described with reference to FIG. 7. Also, the device 300 can include more or different hardware elements and/or modules alone or in combination with those illustrated and described with reference to FIG. 8.

Figure 9A:
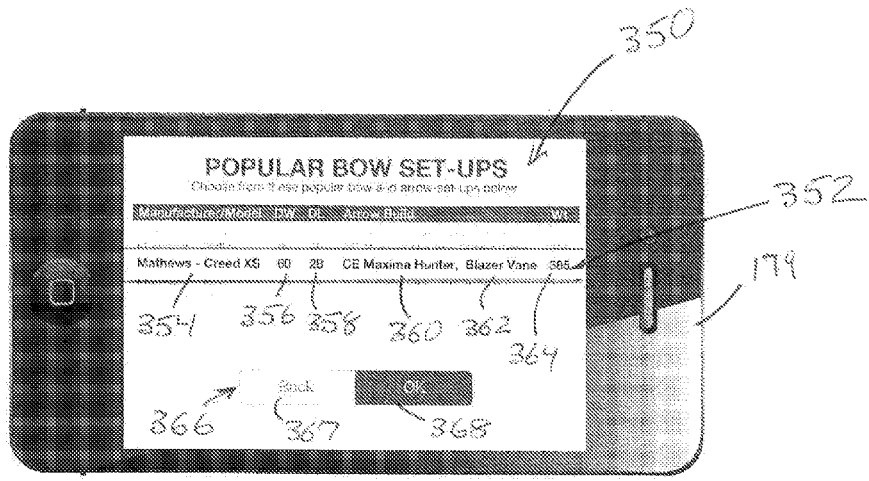
FIGS. 9A-9C illustrate user interfaces presented in a touch display for generating an archery sight setting in accordance with one embodiment.
Figure 9B:
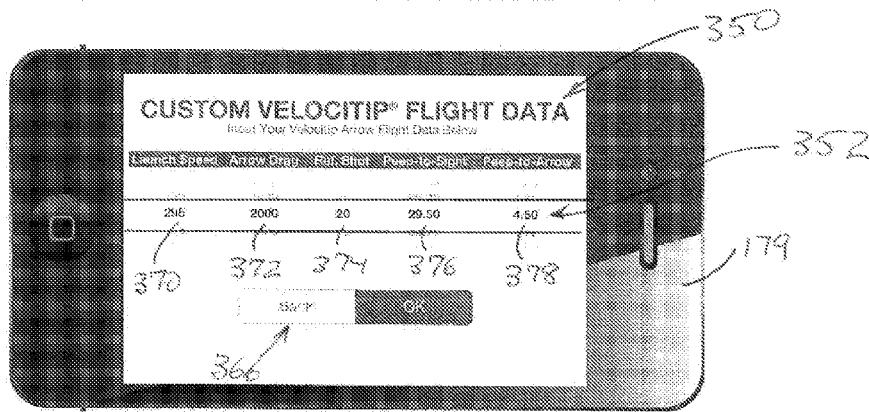
Figure 9C:
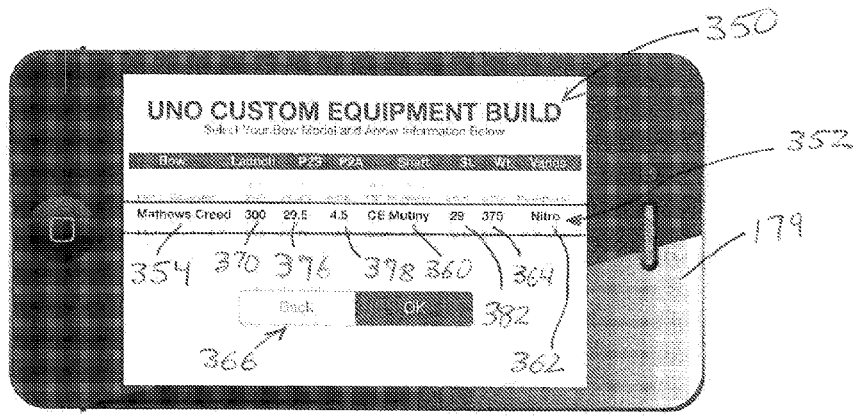

Various embodiments of the apparatus, systems and methods described herein employ an electronic display device to generate sight marks for archery sights that include mechanically-adjusted archery sight pins. According to some embodiments, one or more archery parameters provided by a user are employed to generate the sight marks. FIGS. 9A-9C illustrate a graphical user interface in a touch sensitive display used for archery-parameter selection in accordance with some embodiments. In general, the operations described with reference to FIGS. 9A-16 can be performed with the mobile device 179, the stationary device 188 and the other devices 189 illustrated in FIG. 6. Accordingly, the embodiments described with reference to FIG. 9A to FIG. 16 illustrate a series of display objects of a graphical user interface presented in the display to allow a user to interact with the archery sight-setting application 246. According to these embodiments, the user selects the operation associated with an icon by providing an input in the region of the display where the icon is located, for example, a touch input in embodiments in which the display is touch-sensitive.

Referring to FIGS. 9A-9C, a graphical user interface 350 (a GUI) is presented in a display of the device 179 in accordance with a first embodiment. In general, FIGS. 9A-9C illustrate the GUI 350 in three different embodiments. In each of these embodiments a selection of the archery parameters is followed by a generation and display of one or more sight marks corresponding to the selected archery parameters.

According to the embodiment illustrated in FIG. 9A, a set of sight marks is generated with the device 179 when the user selects one or more archery parameters provided in a first display object 352. The archery parameters include the bow type 354 (manufacturer and model), a bow draw weight (DW) 356, a bow draw length 358, an arrow type 360, a vane (or fletching) type 362, and an arrow weight 364. Each of the graphical user interfaces of FIGS. 9A-9C also include a second display object 366 that allows a user to navigate and/or confirm their selection of archery parameters. In addition, in the illustrated embodiment, the second display object provides a first region 367 for navigating to a prior screen of the GUI, and a second region 368 for confirming the selection of archery parameter 352 presented in the GUI. Although the second display object 366 is illustrated as a single display object that includes two regions 367, 368, the first region 367 and the second region 368 can be presented as a two separate display objects, for example, separate icons. Similarly, the first display object 352 can be presented as a plurality of separate display objects in the GUI 350.

According to the embodiment illustrated in FIG. 9A, the archery parameters include information that falls into the following categories: 1) archery equipment selection information, for example, the bow type 354, the arrow type 360, the arrow vane/fletching type 362; and 2) archery equipment settings, for example, the bow draw weight 356, the draw length 28 and the arrow weight 364.

According to the embodiment illustrated in FIG. 9B, a different combination of archery parameters are used to generate a sight mark or plurality of sight marks for selected archery equipment. According to this embodiment, the first display object 352 includes an arrow launch speed 370, an arrow drag 372, a reference shot distance 374, a peep-to-sight distance 376 and a peep-to-arrow distance 378. Here too, a user employs the GUI 352 to select archery parameter values and/or archery parameter information to generate archery sight settings. According to this embodiment, the archery parameters include information that falls into the following categories: 1) archery equipment performance information, for example, the arrow launch speed 370 and the arrow drag 372; 2) archery equipment settings, for example, the peep-to-sight distance 376 and the peep-to-arrow distance 378; and 3) archery sight information, for example, the reference shot distance 374. According to some embodiments, the reference shot distance 374 is a distance at which the bow is sighted-in. According to these embodiments, the sight mark associated with the reference shot distance 374 is used as a reference mark from which the location of the other sight marks is determined, at least in part.

According to the embodiment illustrated in FIG. 9C, yet another combination of archery parameters are used to generate a sight mark or plurality of sight marks for selected archery equipment. According to this embodiment, the first display object 352 includes the bow type 354, the arrow launch speed 370, the peep-to-sight distance 376, the peep-to-arrow distance 378, the arrow type 360, the arrow shaft length 382, the arrow eight 364 and the arrow vane/fletching type 362. According to this embodiment, the archery parameters include each of: 1) archery equipment selection parameters; 2) archery equipment setting parameters; and 3) archery equipment performance parameters.

The examples provided by FIGS. 9A-9C are non-limiting because different combinations of parameters can be employed in combination depending on the embodiment. For example, in some embodiments, a subset of the archery equipment performance parameters identified in FIG. 9B are used in combination with one or more parameters identified in FIG. 9A.

In the embodiments illustrated in FIGS. 9A-9C, the first display object 352 is provided in the form of a set of spinning wheels used for the selection of archery parameters. However, the display object 352 can be provided in other forms to allow the user to select archery parameters using icons, keypads and sliders as some examples.

Referring to FIGS. 10A-10C, the graphical user interface 350 is presented in the display of the device 179 in accordance with further embodiments. In general, FIGS. 10A-10C illustrate sight marks presented in the GUI 350 and an approach for transferring the sight marks to an archery sight in accordance with one embodiment. According to this embodiment, a selection of the archery parameters results in a generation of sight marks corresponding to the selected archery parameters.

Referring to FIG. 10A, the GUI 350 includes a plurality of sight marks 390 including a reference sight mark 392 and additional sight marks 394. Other display objects and information can be presented in the GUI 352 including icons, symbols and information presented in alpha-numeric form. In the illustrated embodiment, indicia 396 is included to identify the distance to which the sight mark corresponds. In the illustrated embodiment, the reference sight mark 392 corresponds to a shot-distance for which an archery sight is already sighted-in for the archery equipment for which the plurality of sight marks 390 are generated. As described herein, the quantity of sight marks 390, the quantity of reference sight marks 392 and the quantity of other sight marks 396 can vary depending on the embodiment.

FIGS. 10B and 10C illustrate the device 179 including GUI 350 with the plurality of sight marks 390 located proximate the archery sight 102. In particular, FIGS. 10B and 10C illustrate the frame 103 of the archery sight located against a face of the display 180 included in the device 179. As is seen in FIG. 10B, the plurality of sight marks 390 provide a visual reference by which an elevation of the plurality of sight pins 104 can be established in sighted-in positions. In FIG. 10B, the 20 yard pin was used to sight-in the bow at 20 yards. Accordingly, the elevation of the 20 yard pin is set and the 20 yard pin is secured in the frame 103 at that position. Further, FIG. 10B illustrates the 20 yard pin aligned with the reference sight mark 392. The alignment can be accomplished by moving the archery sight 102 relative to the device 179 or vice versa. With the 20 yard pin aligned with the reference sight mark 392, the remaining sight pins can be moved into alignment with corresponding ones of the other sight marks 394. The result is that each of the pins 104 can be located at a sighted-in position (sighted-in elevation within the sight housing) for each of a plurality distances selected by the user.

FIG. 10C illustrates the archery sight with the 20 yard pin aligned with the reference sight mark 392 and the remaining sight pins aligned with others of the sight marks, respectively. In this instance, the archery sight 102 includes five pins 104, the user has elected to have sight marks displayed in 10 yard increments from 20 to 90 yards (with the exception of 50-yards) and elected to setup the archery sight with pins for use at each of 20-yards, 30-yards, 40-yards, 60-yards and 70-yards. This places each of the sight pins 104 at a sighted in position for the respective distance.

Referring to FIG. 11, a flow diagram 400 of process for generating and employing a plurality of sight marks is illustrated in accordance with one embodiment. The process begins at act 402. At act 404, a graphical user interface including an archery sight-setting tool is generated. At act 406 one or more archery parameters are selected using the graphical user interface. In general, the archery parameters are selected to provide the archery sight setting application 246 with information that is employed to determine respective locations of a plurality of sight marks where the locations will place a mechanically-adjusted pin included in the archery sight in a sighted-in position when the process illustrated in FIG. 11 is complete. At act 408 sight settings are generated based on at least one selected archery parameter. As described herein, in some embodiments, sight settings are generated in real-time and the acts 406 and 408 can occur together. At act 410, a plurality of sight marks are presented in the graphical user interface where adjacent sight marks are separated by a distance that matches a distance by which sight marks corresponding to adjacent sighted-in positions of an archery sight are separated. Following act 410, a user can elect to move directly to act 416 where sight marks are transferred from the graphical user interface to an archery sight that includes at least one mechanically-adjusted sight pin. The act 416 can include the processes described and illustrated with reference to FIGS. 10B-10C and FIGS. 13A-13C, respectively. In some embodiments, the act 416 can include an act of printing and/or emailing the sight marks before the sight marks are transferred to the archery sight.

According to further embodiments, the process illustrated in FIG. 11 can include act 412 where the user elects to adjust at least one selected archery parameter and view a change in sight marks resulting from the change. Thus, act 412 can be employed in a process by which the user refines sight settings and/or compares results achieved with different equipment selections. The preceding can include an iterative process by which the archer employs the archery sight setting application 246 to adjust the sight marks in response to any of a variety of changes made.

Although the above-described embodiments provide the archery parameter selection in a first screen and the display of archery sight marks in another screen, some embodiments provide both archery parameter selection and archery sight marks presented together in the graphical user interface. According to some embodiments, such an approach allows a user to view the effects of different archery-parameter-selections on the displayed sight marks in substantially real time. For example, a set of reference sight marks used to establish pin gaps can change before the user's eyes with no discernible delay between the selection of a different archery parameter value and a resulting change in sight mark spacing in the GUI.

According to various embodiments, the plurality of sight marks presented at act 410 are presented in the GUI with a 1:1 ratio between a first distance separating a first sight mark and a second sight mark in the GUI and a second distance separating a first sighted-in position and a second sighted-in position of the archery sight. Thus, for example, the sight marks are presented with the distance separating the 20-yard sight mark and the 40-yard sight mark in the GUI equal to the distance separating the 20-yard pin and the 40-yard pin when in respective sighted-in positions in the archery sight where the sight marks provided in the GUI are based on archery parameters selected by the user and the sighted-in positions of the sight pins are established with archery equipment, archery performance, and archery settings that correspond to those archery parameters selected by the user.

The 1:1 ratio described above allows for a direct transfer of archery sight settings from the GUI to the archery sight. Further, electronic display devices, readily allow a change in the scale of the information presented on the screen, i.e., they allow the user to zoom in and out. Touch screen displays allow a user to zoom in or out with the finger swipes. Accordingly, in some embodiments, the process illustrated in FIG. 11 includes act 414 in which the zoom operation is prevented, that is, the scale of the screen is locked to prevent a user from changing the scale of the sight marks from the 1:1 ratio described above.

At act 418, the process ends with the archery sight including a plurality of sighted-in pin positions.

Embodiments of the process illustrated in the flow diagram 400 can be employed to generate a wide variety of sight marks that are transferred to an archery sight, for example, either for archery sights including sight pins (see FIGS. 10-10C) or those that include sight tapes (see FIGS. 13A and 13B).

Referring to FIG. 12, a flow diagram 430 representing a process concerning a transferring of sight marks to a multi-pin sight is illustrated in accordance with an embodiment. Thus, the flow diagram 430 illustrates how pin gaps are transferred form the device 179 to the archery sight.

The process begins at act 422. At act 424, sight marks are established for archery equipment and presented in the graphical user interface. Thus, in some embodiments, act 424 can include acts 406, 408 and 410 described above. At act 426, a first sight mark is aligned with a first sight pin secured in the archery sight where the first sight mark corresponds to a distance at which the first sight pin is sighted-in, for example, see the reference sight mark 392 illustrated in FIG. 10A. Thus, the act 426 occurs following the archery sight being mounted to the bow, the bow being shot with the selected archery equipment at a known distance, the sight pin being adjusted to place the first sight pin in a sighted-in position for that distance and with that equipment, and the first sight pin being secured in the sighted-in position.

At act 428, a respective position of each of the remaining sight pins is established by aligning the respective sight pin with the corresponding sight mark in the GUI with the first sight mark in alignment with the first sight pin. Once a position of a respective sight pin is established the position of the sight pin is secured in the archery sight housing. Thereafter, the respective sight pin should be in alignment with the corresponding sight mark anytime the first sight pin is in alignment with the first sight mark, for example, where a plurality of additional sight-pin positions are also established at act 428. Further, although FIGS. 10A-10C illustrate the reference sight mark 392 at 20 yards, longer shot-distances can be used to establish the reference sight mark 392. For example, the 30-yard pin could have been sighted in and then the 20-yard, 40-yard, 60-yard and 70-yard sight pin locations determined with the 30-yard pin aligned with the 30-yard reference sight mark. In practice, a user may find that the use of longer shot-distances when establishing a reference sight mark improves the overall precision of the plurality of sight marks. However, sighting-in at longer distances can take more time and be more difficult relative to sighting in at closer distances. According to some embodiments, the acts 426 and 428 correspond to act 416 included in FIG. 11.

At act 430 the process ends with the archery sight including a plurality of sighted-in pin positions.

In general, fine adjustment of archery sight settings requires relatively high resolution whether using a multi-pin sight or a single-pin sight with a sight tape. For example, different sight tapes may offer sight marks with marks for the same distance differing in location on the tape that only vary by hundredths of an inch relative to one another. For example, an archer may want to be able to adjust a position of a sight pin a fraction of the diameter of the sight pin. Thus, where a sight employs a 0.019 inch diameter sight pin, the resolution of the sight marks can realistically be delivered at approximately one half that, or ±0.01 inches. There are limitations on resolution in today's portable electronic devices, however, in some embodiments, the archery sight setting app 246 operates in a portable electronic device that has a display resolution of 1280×720 pixels which is more than sufficient to provide the above-referenced resolution.

Further, the form factor of today's portable electronic devices (both smartphones and tablets, for example) allows the sight pins to be placed in sighted in positions, after shooting at only a single distance to sight in a first pin, to be completed with the sight remaining on the bow. The user only needs to place the device 179 against the face 103 of the sight housing as illustrated in FIGS. 10B and 10C and proceed as described with reference to acts 426 and 428, for example. Alternatively, a sighted-in position of the first pin can be established by shooting the bow with the sight installed and then the sight removed from the bow and placed on the display to transfer the sight marks to respective pin positions for the remaining sight pins.

Referring to FIGS. 13A & 13B, the graphical user interface 350 is presented in the display of the device 179 in accordance with still another embodiments. In general, FIGS. 13A & 13B illustrate sight marks presented in the GUI 350 and an approach for transferring the sight marks to a sight tape for an archery sight in accordance with one embodiment. According to this embodiment, a selection of the archery parameters results in a generation of sight marks corresponding to the selected archery parameters.

FIG. 13A illustrates a plurality of sight marks 440 presented in the GUI 350, for example, in response to a selection of archery parameters. In some embodiments, the sight marks 440 are generated as a result of a process as illustrated in FIG. 11. According to various embodiments the sight marks are scaled to provide a 1:1 ratio between a first distance separating a first sight mark and a second sight mark in the GUI and a second distance separating a first sighted-in position and a second sighted-in position of the archery sight, as described above. FIGS. 13A & 13B illustrate the sight marks 440 including indicia in ten yard increments and in smaller distance increments. Depending on the embodiment, the indicia may be presented every five yards and/or every yard in addition to every ten yards. Because sight marks representing the same distance-increment become farther apart as the shot-distance increases, indicia may only be provided in ten yard increments for close shot distances but may be presented for every one yard increment for further shot distances within the same plurality of sight marks. As illustrated, the plurality of sight marks 440 is rendered in the form of a virtual sight tape, however, the plurality of sight marks 440 can be presented in other forms include crosshairs or a set of hash marks.

The plurality of sight marks 440 can be transferred to the archery sight using a variety approaches depending on the embodiment. In one embodiment, the plurality of sight marks are saved as a file (for example, a PDF) and are printed out. According to this embodiment, the printed form is also scaled to provide a 1:1 ratio between a first distance separating a first sight mark and a second sight mark in the GUI and a second distance separating a first sighted-in position and a second sighted-in position of the archery sight. The user can then attach the printout to the sight housing.

Alternatively, a user can also manually create a sight tape directly from the plurality of sight marks 440 displayed in the GUI 350. FIG. 13B illustrates one such embodiment. As illustrated, a sight tape 442 is placed against the surface of the display included in the device 179. The user then hand-marks the sight tape 442 with a plurality of sight marks 444 corresponding to all or a portion of the plurality of sight marks 440 presented in the GUI 350. So long as the user maintains an alignment of the hand markings a precise set of sight marks are provided on the sight tape 442. One of the benefits of the approach is that the sight mark can be completely prepared in the field without need to access a printer. The newly-created sight tape 442 is then secured to the sight housing.

To ensure that the sight marks are properly located on the sight housing, the single pin sight is set to a first known and sighted-in distance and its location temporarily fixed. The sighting-in process is completed with equipment conforming to and/or providing a first set of archery parameters. The plurality of sight marks 440 are established based on the first set of archery parameters. The user secures the sight tape 442 to the sight housing to align the current sight pin location (or alignment pin location, depending on the embodiment) with the corresponding one of the plurality of sight marks 444. Thereafter, the position of the sight pin can be accurately adjusted for sighted-in distances using the sight tape 442.

Figure 14:
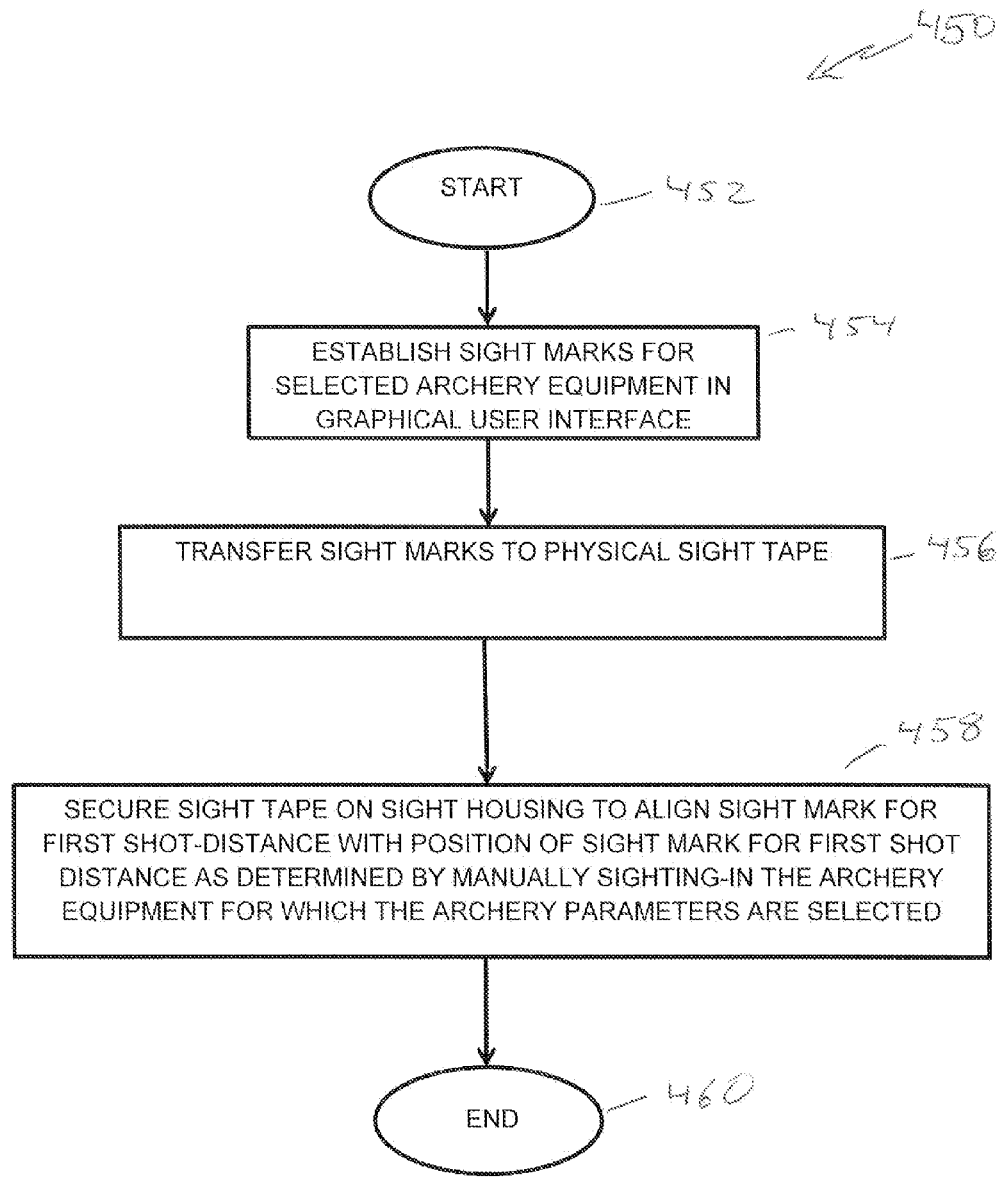
FIG. 14 illustrates a flow diagram of a portion of the process illustrated in FIG. 11 in accordance with another embodiment.

Referring to FIG. 14, a flow diagram 450 representing a process concerning a transferring of sight marks to a single-pin sight is illustrated in accordance with some embodiments. Thus, the flow diagram 450 illustrates how sight marks are transferred form the device 179 to a sight tape for an archery sight.

The process begins at act 452. At act 454, sight marks are established for archery equipment and presented in the graphical user interface. Thus, in some embodiments, act 454 can include acts 406, 408 and 410 described above. At act 456, the plurality of sight marks are transferred to a physical sight tape, for example, as illustrated in FIG. 13B.

At act 458, a sight tape is secured on a sight housing to align a sight mark on the sight tape for a first shot-distance with a position of a sight mark for the first shot distance as determined by manually sighting-in the archery equipment for which the archery parameters are selected, where the sight mark established by manually sighting-in is provided at the archery sight, for example, by the location of an alignment pin included in the archery sight following the sighting-in process.

At act 460 the process ends with the archery sight including a plurality of sighted-in pin positions.

The immediately described embodiments provide an advantage because an accurate set of sight marks can be provided after manually sighting-in at only a single shot-distance. The accuracy of these embodiments will, in part, depend on the amount of archery performance data provided by the user for the selected archery equipment. For example, where arrow drag is measured the result may be highly precise. However, for some archery equipment, measured drag values may be unavailable and accurate estimates may also not be available. Therefore, some further embodiments can allow an archer to more quickly and easily generate a plurality of at least three sight marks after manually sighting in at two distances, thereby still saving time over traditional methods. Further, the approach described with reference to FIGS. 15 and 16 is suitable for and easily used with multi-pin sights unlike prior approaches.

Figure 15:
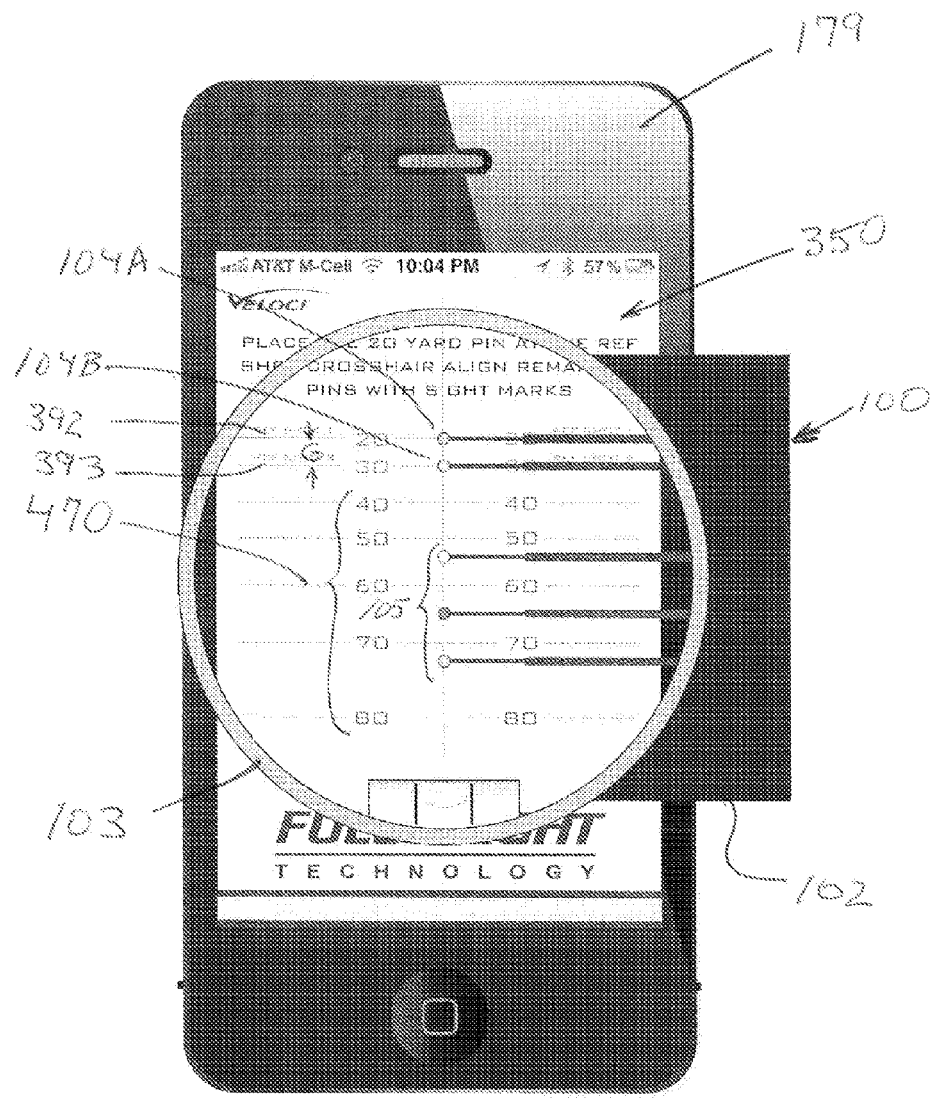
FIG. 15 illustrates a user interface presented in a touch screen display including a plurality of sight marks, with an archery sight, in yet another embodiment.
Figure 16:
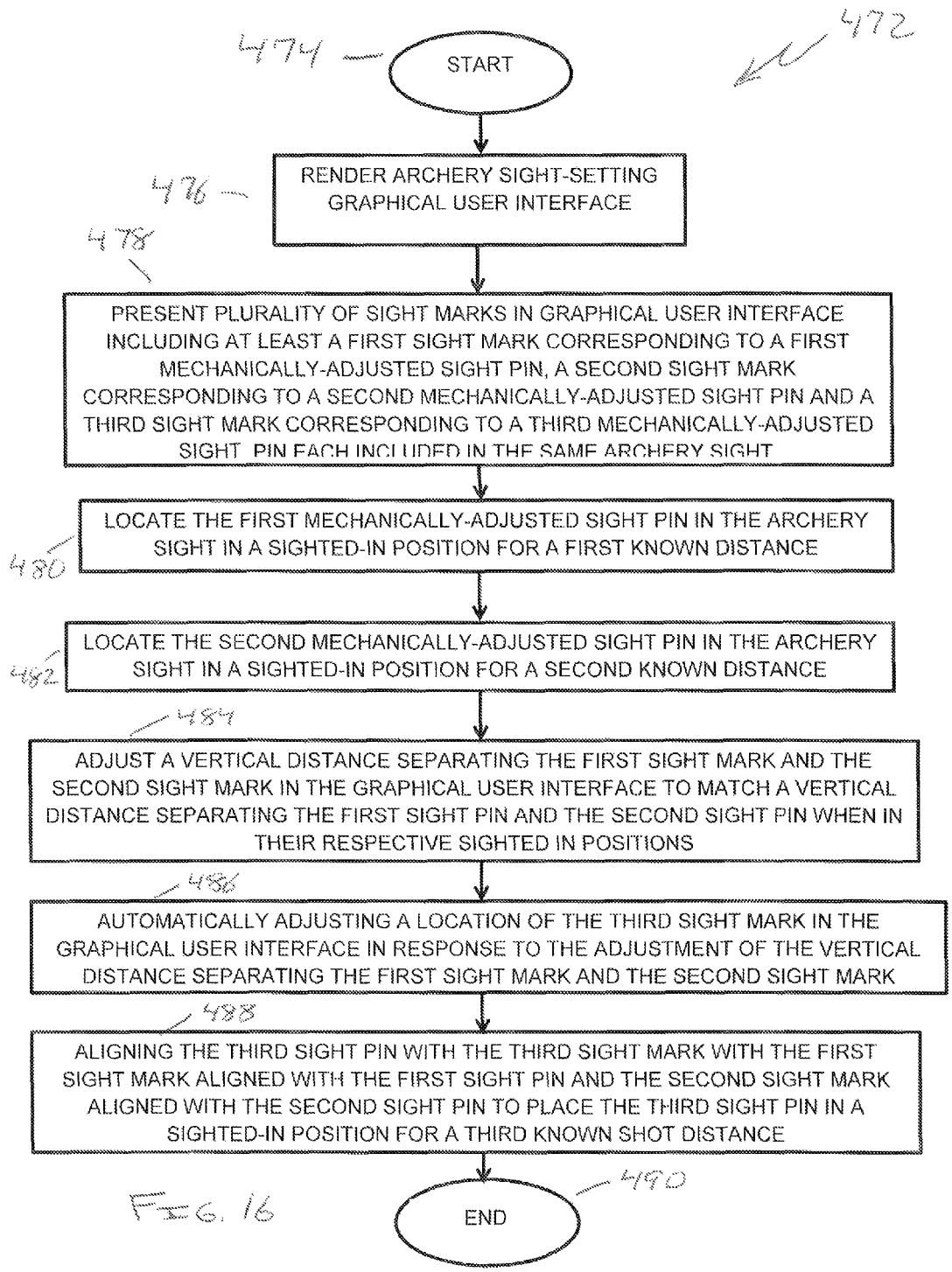
FIG. 16 illustrates a flow diagram of process for generating and employing a plurality of sight marks in accordance with one embodiment.

Referring now to FIG. 15, the graphical user interface 350 is presented in the display of the device 179 in accordance with still further embodiments. In general, FIG. 15 illustrates sight marks presented in the GUI 350 and an approach for setting additional sight marks after sighting-in selected archery equipment at two shot-distances. Unlike some of the above-described approaches, the process described relative to FIG. 15 allows a user to set one or more additional pin gaps by matching a first pin gap in the GUI 350 to a pin gap provided by the manual sighting-in process.

In FIG. 15, the archery sight 100 includes a first sight pin 104A, a second sight pin 104B and a plurality of additional sight pins 105. The first sight pin 104A is sighted in at a first reference shot distance and the second sight pin 104B is sighted in at a second reference shot distance. The GUI 350 includes a plurality of sight marks as selected by the user including a first reference sight mark 392 corresponding to a first shot distance at which the first sight pin 104A is sighted-in and a second reference sight mark 393 corresponding to a second shot distance at which the second sight pin 104B is sighted-in. The first reference sight mark 392 and the second reference sight mark 393 are separated by a gap G. The GUI 350 also includes a plurality of additional sight marks 470.

In operation, the user operates the device 179, for example, using a touch input, to adjust the distance separating the first reference sight mark 392 and the second reference sight mark 393 until the gap G matches the distance separating the first sight pin 104A and the second sight pin 104B in the archery sight. The size of the gap G is indicative of the trajectory of the arrow between the first shot distance and the second shot distance. The device employs the size of the gap G to establish a sighted-in position of at least one additional sight pin 105.

In the illustrated embodiment, the archery sight 102 includes three additional sights pins 105 and five additional sight marks in addition to the first reference sight mark 392 and the second reference sight mark 393. The user can choose to locate each of the other sight pins 105, respectively, at one of the other sight marks, for example, at any one of the 40-yard sight mark, the 50-yard sight mark, the 60-yard sight mark, the 70-yard sight mark and the 80-yard sight mark. When the plurality of other sight pins 105 are located in alignment with these other sight marks (with the first sight pin 104A aligned with the first reference sight mark 392 and the second sight pin 104B aligned with the second reference sight mark 393) the other sight pins are in sighted-in position for a selected distance. In accordance with these embodiments, a plurality of three or more sighted-in pin positions are established for the archery sight 102 after manually sighting-in two of the plurality of sight pins. Further, the preceding can be accomplished without providing any archery parameters.

Thus, the dynamic nature of the display and the ability of a user to move the sight marks allow the user to employ the device to quickly and easily establish a set of sight marks once the archery equipment is sighted-in at two distances. In addition, the form of presentation in, for example, a graphical user interface of mobile device, allows the sight marks for the additional sight pins 105 to be directly transferred to sighted-in pin positions in the archery sight 102.

Although FIG. 15 illustrates the archery sight 102 as being sighted in at shot-distances corresponding to two adjacent sight pins, other approaches can be used. For example, in some embodiments, the first sight pin 104A is sighted in at a short shot-distance (for example, 20 yards) and the second sight pin 104B is sighted in at a relatively long shot distance (for example, 50 or 60 yards). According to these embodiments, one or more of the plurality of additional sight pins 105 may be located between the first sight pin 104A and the second sight pin 104B in a sighted-in pin position for a shot-distance that is somewhere between the first shot distance and the second shot distance.

Referring to FIG. 16, a flow diagram 472 representing a process for establishing a set of sight marks for a multi-pin sight is illustrated in accordance with some embodiments. At act 474 the process starts. At act 476 an archery sight setting tool is rendered in the graphical user interface. At act 478 a plurality of sight marks are presented in the graphical user interface including at least a first sight mark corresponding to a first mechanically-adjusted sight pin, a second sight mark corresponding to a second mechanically-adjusted sight pin and a third sight mark corresponding to a third mechanically-adjusted sight pin where each sight pin is included in the same archery sight. At act 480, the bow is shot and the first mechanically-adjusted sight pin is located in a sighted-in position for a first known distance. At act 482, the bow is shot and the second mechanically-adjusted sight pin is located in a sighted-in position for a second known distance. At act 484, the user adjusts the distance separating the first sight mark and the second sight mark in the GUI to match a distance separating the first sight pin and the second sight pin when in their respective sighted in positions. At act 486, the location of a third reference sight mark located in the GUI is moved to a sighted-in position corresponding to a third known shot distance as the distance between the first reference sight mark and the second reference sight mark is moved to match the distance between the first sight pin and the second sight pin. At act 488, the user adjusts a location of the third sight pin to align the sight pin with the third reference sight mark (while the first sight pin and the second sight pin are aligned with the corresponding sight marks, respectively).

At act 490 the process ends with the three sight pins located in sighted-in positions in the archery sight housing. The process is not limited to only locating a single sight pin in a sighted-in position. For example, a plurality of additional sight pins can be located in sighted-in positions via such a process, for example, each of the additional sights pins 105 illustrated in FIG. 15 can be located in sighted-in positions, respectively via an embodiment of the process.

The dynamic nature of today's display devices, such as the mobile device 179, allows flexibility and easy user adjustment to customize information presented in the archery sight setting tool. For example, in accordance with various embodiments, the user can customize the shot-distances for which sight marks are provided, the number of pins in a multi-pin sight, the zeroed shot-distance (or distances in the case of the embodiments described with reference to FIGS. 15 and 16) and the format (pin gaps or sight tape format) in which the sight marks are displayed.

According to some embodiments, one or a plurality of display objects 197 are presented in the display 180 to allow a user to customize the archery sight setting tool for their equipment and their preferences. According to one embodiment, the user preferences engine at least partly controls the style and type of information presented in the display 180 to consistent with the user's customized preferences.

Although primarily described with reference to a portable device, depending on the embodiment, the apparatus, systems and methods described herein can be implemented using portable or stationary devices, including devices having a temporary or permanent fixed location. Further, although some embodiments are described herein with reference to a touchscreen display, the apparatus, systems and methods described herein can be also be implemented using devices having other forms of display.

Although illustrated as a combination of specialized hardware and software, various aspects of the system 178 such as the application, and/or services 192 can be implemented as specialized software executing in a general purpose computing device such as a PC, a laptop, a tablet computer or other handheld computing device. The computing device can include, for example, a processor connected to one or memory devices, such as a disk drive, flash drive, memory or other device for storing data. Depending on the embodiment, the computing device can communicate over hard-wired or wireless communication interfaces with one or more other devices including, for example, the host system. Accordingly, any of the embodiments described herein can include a non-transitory computer readable medium in which signals are stored that when executed by a processing system implementing aspects described herein. Further, in some embodiments, the system 178 can employ client and server computing devices, for example, in a configuration in which one or more of the devices (179, 188 and 189) operate as the client and the services 192 operate as the server.

Further, aspects can be implemented with a specially-programmed, special purpose hardware, for example, an application-specific integrated circuit (ASIC). Aspects of the invention can be implemented in software, hardware or firmware or any combination thereof. Such methods, acts, apparatus, systems, system elements and components thereof may be implemented as part of the computing system described above or as an independent component or components.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A non-transitory computer-readable medium whose contents cause a processing device including a touch screen display to perform a method of generating an archery sight setting for an archery sight including at least one mechanically-adjusted sight pin, the method comprising:
   rendering a graphical user interface in the touch screen display;
   receiving a first input to the graphical user interface to select at least one archery parameter; and
   presenting a plurality of sight marks in the graphical user interface including at least a first sight mark and a second sight mark, the plurality of sight marks scaled within the graphical user interface to provide a 1:1 ratio between a first distance separating the first sight mark and the second sight mark in the graphical user interface and a second distance separating a first sighted-in position and a second sighted-in position of the archery sight,
   wherein the first distance is determined at least in part based on the at least one selected archery parameter and provides a reference with which to establish the second distance and the second sighted-in position for a shot-distance for which the second sighted-in position of the archery sight is established.

2. The non-transitory computer readable medium of claim 1, further comprising locking the scale of the touch screen display to maintain the 1:1 ratio.

3. The non-transitory computer readable medium of claim 1, further comprising:
   receiving a second input to the graphical user interface to adjust the archery parameter; and
   automatically adjusting the first distance in response to the adjustment of the archery parameter.

4. The non-transitory computer readable medium of claim 3, further comprising automatically adjusting the first distance in substantially real-time in response to the adjustment.

5. The non-transitory computer readable medium of claim 3, further comprising presenting a display element along with the plurality of sight marks in the display, the display element configured to receive the second input as a touch input.

6. The non-transitory computer readable medium of claim 1, further comprising fixing a location of a first sight mark within the display.

7. The non-transitory computer readable medium of claim 6, further comprising adjusting a location of the second sight mark relative to the location of the first sight mark to provide the first distance, based on a selection of the archery parameter.

8. The non-transitory computer readable medium of claim 6, further comprising adjusting a location of each of a plurality of sight marks relative to the location of the first sight mark, the plurality of sight marks including the second sight mark.

9. The non-transitory computer-readable medium of claim 1, further comprising:
   including a third sight mark and a fourth sight mark in the plurality of sight marks, the third sight mark separated from the first sight mark by a third distance, the fourth sight mark separated from the first sight mark by a fourth distance;
   wherein the third distance is intended to match a distance to establish a sighted-in mark for a third known shot-distance, and wherein the fourth known distance is intended to match a distance to establish a sighted-in mark for a fourth known shot-distance.

10. The non-transitory computer readable medium of claim 1, further comprising presenting the plurality of sight marks as a plurality of pin positions for a multi-pin sight.

11. The non-transitory computer readable medium of claim 1, further comprising presenting a virtual sight tape including the plurality of sight marks in the graphical user interface.

12. The non-transitory computer readable medium of claim 1, further comprising receiving a plurality of inputs to the graphical user interface, each of the plurality of inputs concerning a different one of a plurality of archery parameters.

13. The non-transitory computer readable medium of claim 1, further comprising receiving the archery parameter selected from a group consisting of an archery equipment setting, an archery equipment performance and an archery equipment identification.

14. The non-transitory computer readable medium of claim 13, further comprising receiving an input concerning a user parameter.

15. The non-transitory computer readable medium of claim 14, further comprising receiving the user parameter selected from a group consisting of: a height, a weight, a reach, and a gender.

16. An apparatus comprising:
a display;
one or more processors coupled to the display; and
a computer storage medium storing instructions that, when executed by the one or more processors, cause the one or more processors to perform operations that generate an archery sight setting for an archery sight including at least one mechanically-adjusted sight pin including:
rendering a graphical user interface in the display;
receiving a first input to the graphical user interface to select at least one archery parameter; and
presenting a plurality of sight marks in the graphical user interface including at least a first sight mark and a second sight mark, the plurality of sight marks scaled within the graphical user interface to provide a 1:1 ratio between a first distance separating the first sight mark and the second sight mark in the graphical user interface and a second distance separating a first sighted-in position and a second sighted-in position of the archery sight,
wherein the first distance is determined at least in part based on the at least one selected archery parameter and provides a reference with which to establish the second distance and the second sighted-in position for a shot-distance for which the second sighted-in position of the archery sight is established.

17. A computer implemented method for generating an archery sight setting using a graphical user interface presented in a display of a portable electronic device, the archery sight setting generated for an archery sight including at least one mechanically-adjusted sight pin, the method comprising:
receiving a first input to the graphical user interface to select at least one archery parameter; and
presenting a plurality of sight marks in the graphical user interface including at least a first sight mark and a second sight mark, the plurality of sight marks scaled within the graphical user interface to provide a 1:1 ratio between a first distance separating the first sight mark and the second sight mark in the graphical user interface and a second distance separating a first sighted-in position and a second sighted-in position in the archery sight,
wherein the first distance is determined at least in part based on the at least one selected archery parameter and provides a reference with which to establish the second distance and the second sighted-in position for a shot-distance for which the second sighted-in position of the archery sight is established.

18. The computer implemented method of claim 17, wherein the act of receiving includes receiving an input selected from a group consisting of a touch input, a voice input and a cursor input.

19. The computer implemented method of claim 18, further comprising:
receiving a second input to the graphical user interface to adjust the archery parameter; and
adjusting the first distance in response to the adjustment of the archery parameter.

20. The computer implemented method of claim 17, further comprising presenting the plurality of sight marks as a plurality of pin positions for a multi-pin archery sight.

* * * * *